(12) United States Patent
Xu et al.

(10) Patent No.: US 11,664,888 B2
(45) Date of Patent: May 30, 2023

(54) DYNAMIC BANDWIDTH MANAGEMENT WITH SPECTRUM EFFICIENCY FOR LOGICALLY GROUPED TERMINALS IN A BROADBAND SATELLITE NETWORK

(71) Applicant: HUGHES NETWORK SYSTEMS, LLC, Germantown, MD (US)

(72) Inventors: Jun Xu, Takoma Park, MD (US); Chandrasekhar Sangireddi, Boyds, MD (US); Robert James Torres, New Market, MD (US); Thomas Jagodits, Poolesville, MD (US); Sandeep Ahluwalia, Gaithersburg, MD (US); Satyajit Roy, Gaithersburg, MD (US); Amit Arora, Clarksburg, MD (US); Joseph Sanju George, Gaithersburg, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 222 days.

(21) Appl. No.: 16/914,784

(22) Filed: Jun. 29, 2020

(65) Prior Publication Data
US 2020/0328804 A1 Oct. 15, 2020

Related U.S. Application Data

(62) Division of application No. 14/480,127, filed on Sep. 8, 2014, now Pat. No. 10,700,772.

(51) Int. Cl.
*H04B 7/185* (2006.01)
*H04W 72/121* (2023.01)
(Continued)

(52) U.S. Cl.
CPC ..... *H04B 7/18586* (2013.01); *H04B 7/18523* (2013.01); *H04W 72/121* (2013.01);
(Continued)

(58) Field of Classification Search
None
See application file for complete search history.

(56) References Cited

U.S. PATENT DOCUMENTS

| | | | | |
|---|---|---|---|---|
| 6,324,184 B1 * | 11/2001 | Hou | ..................... | H04L 12/5602 |
| | | | | 370/468 |
| 6,438,141 B1 * | 8/2002 | Hanko | ................... | H04L 47/823 |
| | | | | 370/468 |

(Continued)

FOREIGN PATENT DOCUMENTS

WO    WO 2012/138714    10/2012

*Primary Examiner* — Alpus Hsu
*Assistant Examiner* — Camquyen Thai
(74) *Attorney, Agent, or Firm* — Sheppard, Mullin, Richter & Hampton LLP

(57) ABSTRACT

Systems and methods are provided to achieve dynamic bandwidth allocation among terminal groups (TGs) with proportional fairness in terms of both throughput and spectrum usage across a network. Quality of service (QoS) metrics for such TGs can be satisfied in terms of maximum throughput and spectrum utilization, while also satisfying QoS metrics such as latency, throughput, and prioritized traffic services for individual terminals within the TGs. A centralized bandwidth manager can be utilized to manage such dynamic bandwidth allocation across multiple Code Rate Organizers (CROs), including environments in which the multiple CROs manage communications across multiple IPGWs for multiple terminal groups. Because, in such environments, a given conventional CRO cannot effectively manage allocations across the entire network, the centralized bandwidth management functionality can be introduced to assess the flows for multiple TGs across multiple CROs and to make bandwidth allocations accordingly.

20 Claims, 11 Drawing Sheets

---

DETERMINE MAXIMUM BANDWIDTH ALLOCATION LIMIT FOR EACH TG
600

CALCULATE AN EMA FOR AN ALLOCATED BANDWIDTH OF A TG AT A GIVEN TIME
602

CALCULATE A SORTING RATIO BASED ON TG'S SUBSCRIPTION RATE AND WEIGHT AS WELL AS ITS ESTIMATED SPECTRUM EFFICIENCY AND THROUGHPUT (FOR THE RESPECTIVE CRO) AND ASSIGN BANDWIDTH TO THE TG WITH THE SMALLEST RATIO
604

(51) Int. Cl.
 *H04W 88/16* (2009.01)
 *H04L 47/629* (2022.01)
 *H04W 72/543* (2023.01)

(52) U.S. Cl.
 CPC ......... *H04L 47/629* (2013.01); *H04W 72/543* (2023.01); *H04W 88/16* (2013.01)

(56) References Cited

U.S. PATENT DOCUMENTS

| | | | |
|---|---|---|---|
| 7,957,410 B2* | 6/2011 | Mosko | H04W 72/0486 |
| | | | 370/461 |
| 8,996,051 B1 | 3/2015 | Gemelos | |
| 9,276,665 B1 | 3/2016 | Johnson et al. | |
| 9,479,447 B2* | 10/2016 | Samuels | H04L 47/36 |
| 2005/0055694 A1* | 3/2005 | Lee | G06F 9/4881 |
| | | | 718/100 |
| 2006/0215628 A1 | 9/2006 | Olariu et al. | |
| 2008/0298299 A1 | 12/2008 | Thesling | |
| 2009/0073876 A1 | 3/2009 | Kimmich et al. | |
| 2009/0290536 A1 | 11/2009 | Eidenschink et al. | |
| 2010/0120359 A1 | 5/2010 | Agarwal | |
| 2011/0258669 A1 | 10/2011 | Antia et al. | |
| 2012/0198502 A1 | 8/2012 | Qin et al. | |
| 2013/0135996 A1 | 5/2013 | Torres et al. | |
| 2013/0136004 A1 | 5/2013 | Torres et al. | |
| 2013/0329630 A1 | 12/2013 | Becker | |
| 2014/0317295 A1* | 10/2014 | Martini | H04L 47/808 |
| | | | 709/226 |
| 2015/0029950 A1 | 1/2015 | Rath et al. | |
| 2016/0006500 A1 | 1/2016 | Radpour | |
| 2016/0028472 A1 | 1/2016 | Valencia | |

\* cited by examiner

DETERMINE A CRO-LEVEL BANDWIDTH ALLOCATION FOR A TG IN ACCORDANCE WITH A PRE-CONFIGURED SUBSCRIPTION RATE
520

ADJUST THE CRO-LEVEL BANDWIDTH ALLOCATION BASED ON NON-REAL-TIME TRAFFIC CAPACITY OF A CRO ASSOCIATED WITH A TG, AND A CONFIGURED MINIMUM BANDWIDTH REQUIREMENT FOR THE TG
522

CALCULATE BANDWIDTH ALLOCATION FOR THE TG BASED ON THE ADJUSTED CRO-LEVEL BANDWIDTH ALLOCATION AND A DEMAND REQUEST ASSOCIATED WITH THE TG
524

FIG. 5B

DETERMINE MAXIMUM BANDWIDTH ALLOCATION LIMIT FOR EACH TG
600
CALCULATE AN EMA FOR AN ALLOCATED BANDWIDTH OF A TG AT A GIVEN TIME
602
CALCULATE A SORTING RATIO BASED ON TG'S SUBSCRIPTION RATE AND WEIGHT AS WELL AS ITS ESTIMATED SPECTRUM EFFICIENCY AND THROUGHPUT (FOR THE RESPECTIVE CRO) AND ASSIGN BANDWIDTH TO THE TG WITH THE SMALLEST RATIO
604
FIG. 6

```
┌─────────────────────────────────────────────────────────────┐
│  DETERMINE A RATIO OF MEASURED INFORMATION RATE PRIOR TO    │
│    COMPRESSION AND MEASURED INFORMATION RATE AFTER          │
│                      COMPRESSION                            │
│                          800                                │
└─────────────────────────────────────────────────────────────┘
                              │
                              ▼
┌─────────────────────────────────────────────────────────────┐
│     RECEIVE AN ORIGINAL INFORMATION RATE OF A TG DURING     │
│            DETERMINATION OF BANDWIDTH ALLOCATION            │
│                          802                                │
└─────────────────────────────────────────────────────────────┘
                              │
                              ▼
┌─────────────────────────────────────────────────────────────┐
│  APPLY THE RATIO TO THE ORIGINAL INFORMATION OF THE TG TO   │
│   CONVERT THE ORIGINAL INFORMATION RATE TO A CARRIED        │
│              INFORMATION RATE FOR THE TG                    │
│                          804                                │
└─────────────────────────────────────────────────────────────┘
```

FIG. 8

DYNAMIC BANDWIDTH MANAGEMENT WITH SPECTRUM EFFICIENCY FOR LOGICALLY GROUPED TERMINALS IN A BROADBAND SATELLITE NETWORK

REFERENCE TO RELATED APPLICATION

The present application is a divisional of and claims priority to U.S. patent application Ser. No. 14/480,127, filed Sep. 8, 2014, which has been granted as U.S. Pat. No. 10,700,772, issued on Jun. 30, 2020 and titled "DYNAMIC BANDWIDTH MANAGEMENT WITH SPECTRUM EFFICIENCY FOR LOGICALLY GROUPED TERMINALS IN A BROADBAND SATELLITE NETWORK," which is incorporated herein by reference in its entirety.

TECHNICAL FIELD

The present disclosure relates generally to broadband networks. More particularly, some embodiments of the present disclosure are directed toward systems and methods for managing bandwidth allocation for terminal groups based on a proportionality scheme.

BACKGROUND

Users in a shared access broadband network may be logically grouped based on the business type, policy, service agreement, and so on. These users may be spread over a large geographical area and they may access the shared bandwidth from their respective remote access points (e.g., terminals) to an aggregation point, such as a network gateway. An operator on that shared access broadband network may provide, for example, internet services to one or more groups of users that subscribe to bandwidth from the operator. Such a group of terminals may, for example, be an enterprise with terminals in multiple geographical locations, or a virtual network operator (VNO) that provides internet services to users in a large geographic area. A logical group of terminals may sometimes be referred to as a terminal group (TG).

On the outroute (i.e., the forward direction such as from the gateway to a remote terminal) of a satellite network, traffic from numerous sources may be multiplexed into a data stream that may be transmitted over the air interface. Due to various quality of service (QoS) requirements and customer classification criteria, the incoming traffic data may first be grouped into multiple IP and acceleration gateways before being multiplexed at a link layer gateway where the data stream to be sent over the air interface is formed. Consider, for example, a digital video broadcast satellite network such as, for example, a DVBS-2 based geosynchronous earth orbit satellite network. DVB-S2 is a digital television broadcast standard developed by the DVB project (an industry consortium), and ratified by the European Telecommunications Standards Institute (ETSI) envisioned for broadcasting services, interactive services including Internet access, and data content distribution. In such a network, the IP layer and link gateway may be referred to as the IP gateway (IPGW) and the satellite gateway (SGW), respectively. The data stream may be broadcast to remote network nodes such as Very Small Aperture Terminals (VSATs).

Existing methods for using the satellite spectrum and providing QoS services to different traffic classes are based upon the needs of individual terminals. Challenges may arise when terminals are logically grouped but still physically spread across part or all of the network.

SUMMARY

Systems and methods are provided in various embodiments for performing centralized bandwidth management for TGs in a shared access network.

In accordance with one embodiment of the technology disclosed herein, a method of dynamic bandwidth allocation comprises receiving, from a plurality of IPGW instances, a demand request with demand, spectrum efficiency information, and throughput for each of a plurality of terminal groups TGs. The method further comprises, passing to a bandwidth manager, capacity and for each of the plurality of TGs, demand, spectrum efficiency information, and throughput to be used for determining bandwidth partitioning across the plurality of TGs. Further still, the method comprises receiving, from the bandwidth manager, an assigned bandwidth based on the bandwidth partitioning to be applied to the plurality of TGs and IPGW instances associated with each of the plurality of TGs, and allocating the assigned bandwidth to each IPGW instance.

In accordance with another embodiment of the technology disclosed herein, a system for dynamic bandwidth allocation comprises a plurality of Internet Protocol Gateways IPGWs. The system further comprises an SGW configured to transmit and receive data packets to and from the plurality of IPGWs, the SGW comprising a plurality of code rate organizers (CROs) adapted to organize the transmission and receipt of the data packets via access to a radio resource. Additionally, the system includes a plurality of satellites configured to relay the data packets to and from a plurality of terminals that are logically grouped together as TGs but physically separated from each other. Additionally still, the system comprises a bandwidth manager configured to conduct centralized bandwidth partitioning for the TGs across the plurality of CROs connected to one or more satellites.

In accordance with still another embodiment of the technology disclosed herein, a method of bandwidth allocation comprises determining a maximum bandwidth allocation limit for each TG of a shared access broadband network, each TG including a plurality of terminals that are logically grouped together and physically separated from each other. Additionally, the method comprises calculating an exponential moving average for an allocated bandwidth of each TG at a given time, and calculating a sorting ratio based on a TG's subscription rate and weight as well as the estimated spectrum efficiency and throughput for its respective CRO and assigning bandwidth to a TG having the smallest calculated sorting ratio.

In accordance with another embodiment of the technology disclosed herein, a method of rate conversion in the context of bandwidth allocation comprises determining a ratio of measured information rate prior to compression and measured information rate after compression. The method further comprises receiving, during determination of bandwidth allocation across a plurality of TGs of a shared access broadband network, each TG of the plurality of TGs including a plurality of terminals that are logically grouped together and physically separated from each other, an original information rate of each TG. Moreover, the method comprises applying the ratio to the original information rate of each TG to convert the original information rate of each TG to a carried information rate for each TG.

Still another embodiment of the technology disclosed herein comprises another method of dynamic bandwidth allocation comprising, determining, at a bandwidth manager, available overall bandwidth of an entire shared access broadband network. The method further comprises comparing the available overall bandwidth of the entire shared access broadband network to communication needs associated with each of a plurality of TGs operative in the shared access broadband network, the communication needs comprising at least one of estimated bandwidth, demand requests, and spectrum efficiency associated with each of the plurality of TGs. Further still, the method comprises partitioning the available overall bandwidth across the plurality of TGs to proportionally satisfy the communications needs of each of the plurality of TGs.

In accordance with yet another embodiment of the technology disclosed herein, a method of dynamic bandwidth allocation comprises receiving demand, usage efficiency of a resource, and throughput information associated with each of a plurality of groups of nodes in a communications network. Furthermore, the method comprises passing, to a network controller, the demand, usage efficiency, and throughput information along with capacity of the resource at a gateway of the communications network associated with the plurality of groups of nodes to be used for determining partitioning of the resource across the plurality of groups of nodes. Further still, the method comprises receiving, from the network controller, an assigned bandwidth based on the determined partitioning of the resource to be applied to the plurality of groups of nodes, and ultimately allocating the assigned bandwidth.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5B is a flow chart illustrating example processes for bandwidth partitioning in accordance with various embodiments.

FIG. 6 is a flow chart illustrating example operations performed for bandwidth partitioning considering proportional fairness in accordance with various embodiments.

FIG. 8 is a flow chart illustrating example operations performed for converting information rates in accordance with various embodiments.

Figure 1:
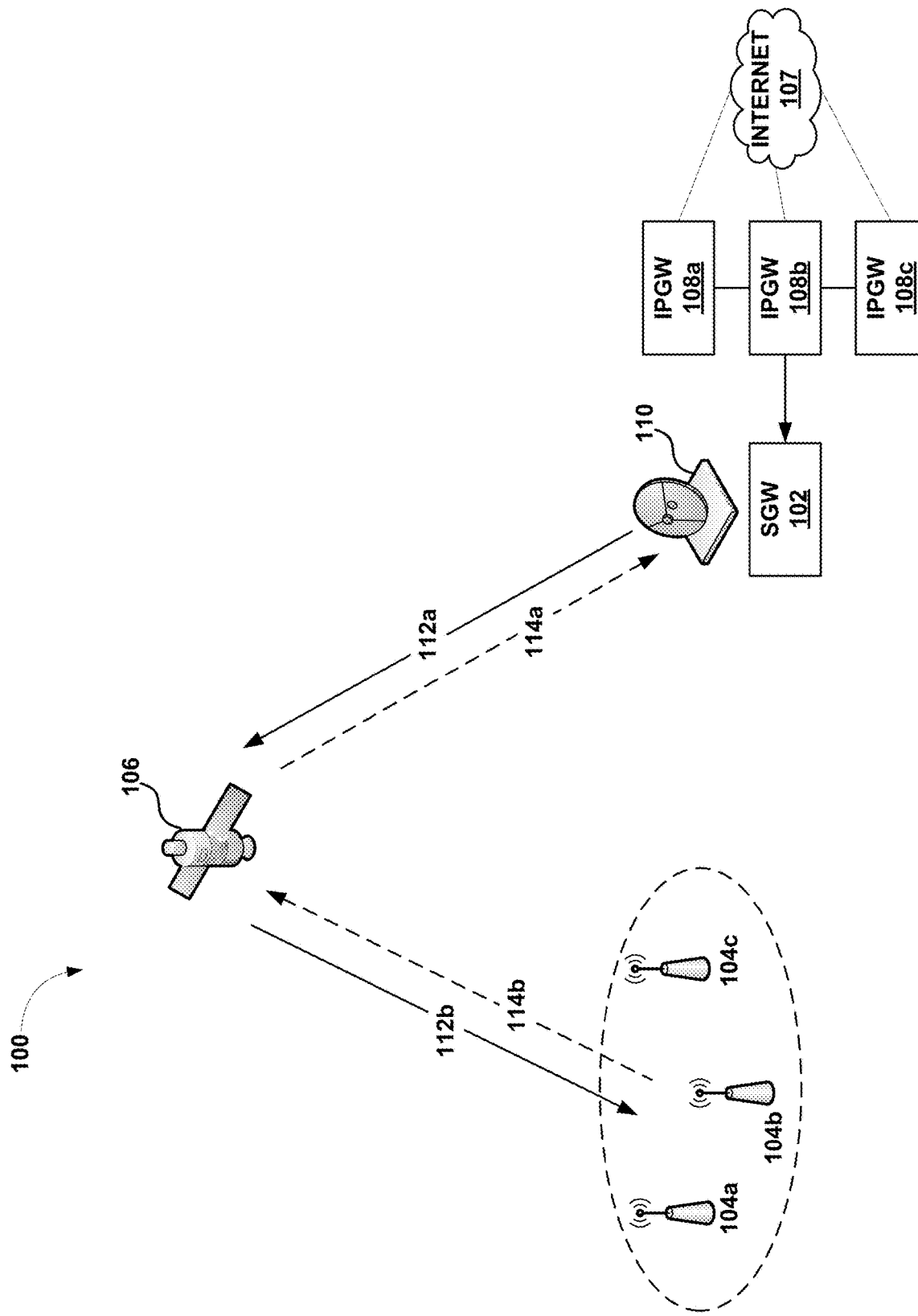
FIG. 1 illustrates an example single satellite data transmission system.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for bandwidth allocation among Terminal Groups (TGs) in a shared access network. Certain of these techniques may include an allocation governed by a proportional fairness in terms of both throughput and spectrum usage across the network. It should be noted that although various embodiments for providing bandwidth management are described in the context of the outroute, various embodiments can be implemented for bandwidth management on the inroute as well.

As noted above, terminals from a TG may be geographically separate from each other while being logically grouped together, and may be covered by different spot beams of different satellites. Accordingly, the bandwidth usage and allocation for a TG may, in various embodiments, address multiple beams and multiple satellites such that the throughput of a TG can be monitored and controlled across an entire satellite network. Moreover, bandwidth in various embodiments may be allocated such that the actual throughput of each TG is allocated with proportional fairness—that is, the allocation for a TG is proportional relative to its respective maximum subscribed rate or to some pre-assigned weight.

Accordingly, various embodiments of the present disclosure provide a dynamic bandwidth management scheme for TGs with spectrum efficiency in a shared access network via a centralized entity, which can be referred to as a bandwidth manager. Embodiments may be implemented in which the throughput of TGs over multiple radio resource pools (i.e., across multiple spot beams) can be managed. In some implementations, bandwidth allocation among TGs can be achieved with proportional fairness in terms of both throughput and spectrum usage across a network, where the spectrum efficiency of a TG may be based on an aggregation of all terminals in the TG.

Accordingly, embodiments can be implemented in which unintended allocations can be avoided. For example, consider a conventional bandwidth allocation method in which a TG may be allocated bandwidth up to its maximum subscribed rate, but during times of congestion, TGs across the satellite network may not reach that maximum subscribed rate. Further consider a scenario in which a TG as a whole experiences poor channel conditions. In these conditions, the conventional allocation may result in satellite spectrum consumed by the affected TG much greater than it should otherwise receive, resulting in spectral unfairness to TGs with good channel conditions. Embodiments can be implemented in which this condition may be avoided, or its frequency of occurrence reduced. Furthermore, bandwidth partitioning among TGs with spectral fairness can be implicitly reflected in the spectrum utilization at the satellite gateway's link layer. The proportional fairness in spectrum usage may also be at the link layer.

Additionally, a centralized bandwidth manager may be provided to manage bandwidth allocations across multiple Code Rate Organizers (CROs), including environments in which the multiple CROs manage communications across multiple IPGWs for multiple terminal groups. Because, in such environments, a given conventional CRO cannot effectively manage allocations across the entire network, the centralized bandwidth management functionality can be introduced to assess the flows for multiple TGs across multiple CROs and to make bandwidth allocations accordingly.

As described above, on the outroute of a network such as a DVBS-2 based GEO satellite network, traffic from numerous sources can be multiplexed into a combined data stream that is transmitted over an air interface. Due to various QoS requirements and customer classification criteria, incoming traffic data may first be grouped into multiple IPGWs before being multiplexed at a SGW, where the data stream over air interface is formed. The data stream may then be broadcast to remote terminals.

FIG. 1 illustrates an example multi-IPGW, single Code Rate Organizer (CRO), satellite network 100 in which elements involved in outroute communications/traffic are described. Satellite network 100 in this example can include a satellite ground station or SGW 102, remote terminals 104a, 104b, and 104c, a satellite 106, an internet 107, IPGWs 108a, 108b, and 108c, and an RF terminal 110. The satellite network may be a shared access broadband network. Other types of shared access networks may include, for example, wireless networks such as 4$^{th}$ Generation Long Term Evolution (4G LTE) and WiMAX networks, which may include terminals other than VSATs, such as cellular and WiFi equipped devices.

SGW 102 may be connected to remote terminals 104a-104c via satellite 106. Feeder links may carry data between SGW 102 and satellite 106, and may include a forward uplink 112a for transmitting data from SGW 102 to satellite 106, and a return downlink 114a for transmitting data from satellite 106 to SGW 102. User links may carry data between satellite 106 and remote terminals 104a-104c, and may include a return uplink 114b for transmitting data from remote terminals 104a-104c to satellite 106, and a forward downlink 112b for transmitting data from satellite 106 to remote terminals 104a-104c. The forward uplink 112a and the forward downlink 112b may form an outroute, and the return uplink 114b and the return downlink 114a may form an inroute. SGW 102 may include high capacity earth stations with connectivity to ground telecommunications infrastructure. SGW 102 may be communicatively connected to RF terminal 110. RF terminal 110 may include an antenna, electronics and connectivity to allow communications access to satellite 106. RF terminal 110 may include the physical equipment responsible for sending and receiving signals to and from satellite 106, and may provide an air interface for SGW 102.

Each of remote terminals 104a-104c can be, for example, VSATs and may connect to the Internet through satellite 106 and SGW 102. For example, remote terminal 104a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 106, as well as a satellite modem and other equipment for managing the sending and receiving of data. They may also include one or more remote hosts, which may be computer systems or other electronic devices capable of network communications at a site remote from SGW 102.

Satellite 106 may be any suitable communications satellite. For example, satellite 106 may be a bent-pipe design geostationary satellite, which can accommodate innovations and variations in transmission parameters, operating in the Ka-band. Satellite 106 may use spot beams as well as frequency and polarization reuse to maximize the total capacity of satellite network 100. Signals passing through satellite 106 in the forward direction (toward remote terminals 104a-104c) may be based on the DVB-S2 standard (ETSI EN 302 307) using signal constellations up to and including at least 16-APSK. The signals intended to pass through satellite 106 in the return direction (toward terminals 104a-104c) may be based on the Internet Protocol over Satellite (IPoS) standard (ETSI TS 102 354). Other suitable signal types may also be used in either direction, including, for example higher data rate variations of DVB-S2.

IPGWs 108a-108c may include an ingress portion of the local network at SGW 102. Data from outside SGW 102 may enter SGW 102 through IPGWs 108a-108c. IPGWs 108a-108c may each include a spoofer, which may acknowledge IP traffic, including TCP traffic, sent to SGW 102. Moreover, SGW 102 may be connected to an internet through IPGWs 108a-108c. IP traffic, including TCP traffic, from the internet may enter SGW 102 through IPGWs 108a-108c. As illustrated in FIG. 1, multiple IPGWs (e.g., IPGWs 108a-108c) may be connected to a single SGW (e.g., SGW 102), sharing the bandwidth of RF terminal 110. At each of IPGWs 108a-108c, real-time (RT) and non-real-time (NRT) traffic flows may be classified into different priorities. These traffic flows may be processed and multiplexed before being forwarded to priority queues at SGW 102. RT traffic may go directly to an RT priority queue or SGW 102, while NRT traffic flows may be serviced based on the respective priority and volume. Data may be further packed into DVB-S2 code blocks and stored in a code block buffer before transmission.

Data from an internet intended for a VSAT (e.g., remote terminals 104a-104c) may be in the form of IP packets, including TCP packets and User Datagram Protocol (UDP) packets, or any other suitable IP packets, and may enter SGW 102 at any one of IPGWs (e.g., IPGW 108a), where the respective spoofer may send an acknowledgement back to the sender of the IP packets. The IP packets may be processed and multiplexed by SGW 102 along with IP packets from the other IPGWs (108b and 108c), where IPGWs 108b and 108c may or may not have the same service capabilities and relative priorities. The IP packets may then be transmitted to satellite 106 on forward uplink 112b using the air interface provided by RF terminal 110. Satellite 106 may then transmit the IP packets to a VSAT using forward downlink 112a. Again, this may be the outroute. Similarly, IP packets may enter the ingress at a VSAT, be processed by the VSAT, and transmitted to satellite 106 via the VSAT's air interface on return uplink 114a. Satellite 106 may then send the IP packets to SGW 102 using return downlink 114a. This may be the inroute.

At IPGWs 108a-108c, higher layer data packets for multiple remote terminals 104a-104c may be queued and scheduled for transmission at the lower layers. The scheduled packets can be forwarded to multiplexing queues at SGW 102. SGW 102 can perform Satellite Link Control (SLC) and Medium Access Control (MAC) functions for data transmission over forward uplink 112a. A key component of an SGW (alluded to previously) is a CRO. A CRO is a module/component that organizes data transmission to access a certain radio resource based on the respective modulation and coding rate (i.e., the MODCOD scheme alluded to previously) such that spectrum utilization can be optimized. The CRO may dynamically estimate bandwidth capacity in terms of data rate and organize incoming data from IPGWs into a multiplexed data stream so as to fully utilize the spectrum bandwidth for transmission. The multiplexed data stream can then be broadcast to remote terminals associated with the CRO. It should be noted that although a remote terminal may receive the entirety of the data stream, the remote terminal only accesses its own part via specific addressing.

Figure 2:
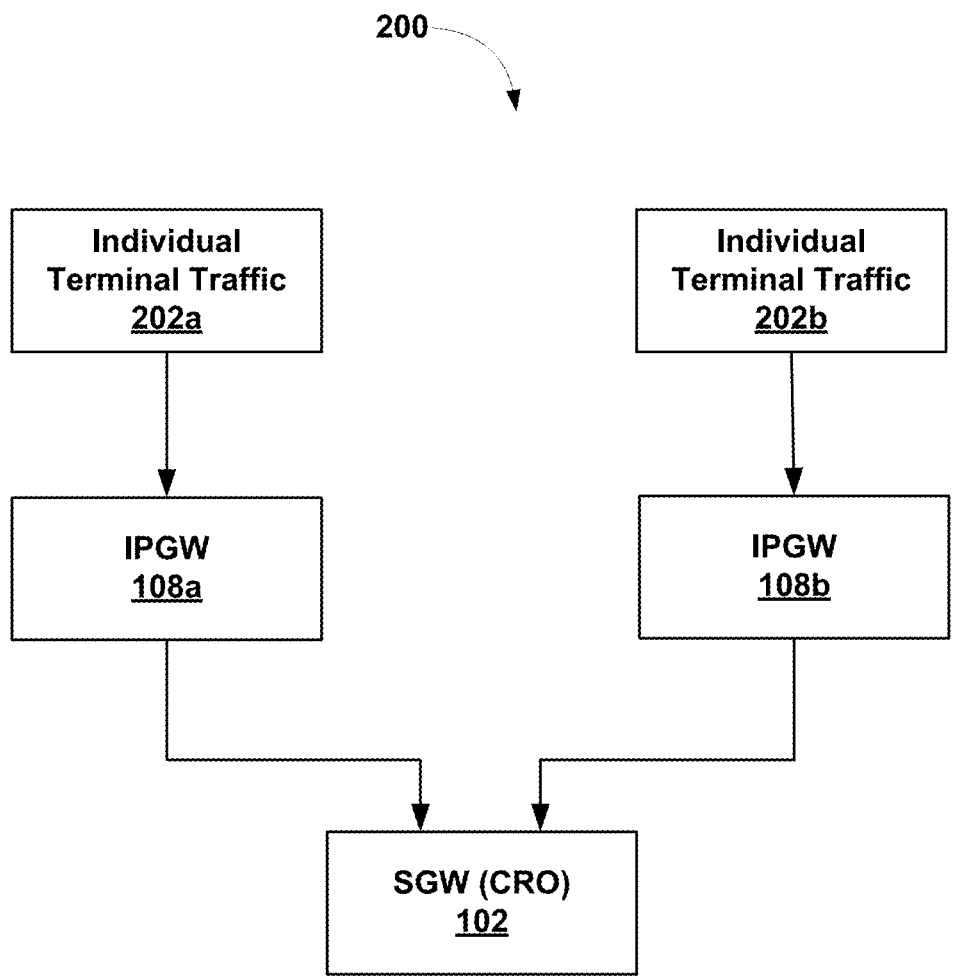
FIG. 2 is a diagrammatic representation of a multi-IPGW, single-CRO traffic model for an individual terminal in the satellite data transmission system of FIG. 1.

A certain spectrum resource of a satellite spot beam covering a geographical area is generally associated with one CRO in accordance with satellite network 100. In other words, a particular remote terminal at a certain location is generally served by only one CRO at a time. A satellite beam may have multiple CROs associated with it by virtue of splitting the spectrum, but a single CRO only serves one beam. As such, one or more IPGWs can be deployed and associated with one CRO, subject to an IPGW's processing capacity, remote terminals' rate plan, as well as business needs. FIG. 2 illustrates an example of such a multi-IPGW, single-CRO model 200 for individual remote terminals. In this example, individual remote terminal traffic 202a may be directed to IPGW 108a, which in turn may be directed to SGW 102 having a single CRO. Additionally, individual remote terminal traffic 202b may be directed to IPGW 108b, which may also be directed to SGW 102.

That is, and at a high level, all traffic from individual terminals can be directed through one or more IPGWs, which are ultimately directed to a single CRO. CROs may grant bandwidth to individual terminals in response to demand requests from IPGWs. For example, an IPGW may request, e.g., every 100 ms, that the CRO assign some desired amount of bandwidth to individual terminals. The CRO, based upon the demand request, may make a determination as to what it can offer across all the IPGWs it services based on some available amount of bandwidth.

As alluded to above, the aforementioned systems and methods for an enhanced queueing architecture and algorithms for improving spectrum utilization, fairness, latency and throughput performance may be based upon QoS metrics targeted to individual remote terminals. Challenges arise when terminals are logically grouped yet still physically spread across multiple beams of the satellite network that may include multiple satellites. Such a scenario would involve a multi-IPGW, multi-CRO system, where the physical spectrum resources of the satellite network are accessed by the CROs. That is, one SGW could have one or more CROs running on servers that can (in part) make up an SGW.

Because bandwidth management on a CRO is independent of a particular satellite, managing the network resources of multiple satellites can be achieved by managing the bandwidth allocation on corresponding CROs. That is, the traffic of individual terminals in a multi-IPGW, multi-CRO system (where the terminals can be logically grouped together in a TG even though the terminals may be geographically separated) can be handled through more than one CRO. Additionally, IPGWs may still make demand requests of CROs. However, and in accordance with various embodiments, such demand requests may be made on behalf of a group of terminals, i.e., a TG. TGs can be bounded by some subscription rate plan/policy, meaning that each terminal in a TG has a subscription rate.

A bandwidth manager may, therefore, be utilized to allocate bandwidth across all TGs (i.e., on the TG-level) communicating through multiple CROs. To accomplish this, the bandwidth manager can communicate with each CRO and determine how much bandwidth each TG on a particular CRO should receive (such allocation also taking into consideration, e.g., the subscription rate plans of each TG). In particular, the CRO receives demand requests, as well as spectrum efficiency information, from the IPGW instances. Multiple CROs, each with their respective needs based on the IPGW reporting, send the estimated bandwidth, together with demand request, as well as IPGW's spectrum efficiency of each IPGW instance, to the bandwidth manager.

Taking this information into consideration (applicable to multiple TGs across multiple CROs), the bandwidth manager allocates bandwidth to each TG. That is, the bandwidth manager performs bandwidth partitioning for multiple CROs, resulting in the allocated bandwidth (e.g., in kbps) at each CRO for multiple TGs. In particular, the bandwidth manager, can be aware of the overall bandwidth available on the network. Upon receiving the estimated bandwidth, demand request(s), and spectrum efficiency information representative of the needs of TGs from multiple CROs, the bandwidth manager is able to compare the estimated bandwidth, demand request(s), and spectrum efficiency information to the overall bandwidth available on the network. Upon making this comparison, the bandwidth manager can partition the overall available bandwidth to optimally satisfy the estimated bandwidth, demand request(s), and spectrum efficiency needs of each TG across the network. Thereafter, the bandwidth manager sends a message to the CROs indicating the allocated bandwidth. Details regarding these processes are described in greater detail below.

The CROs receive their respective message of assigned bandwidth for each TG and its associated IPGW instances from the BM. Using the assigned bandwidth for a TG and the demand requests, the CRO allocates the assigned bandwidth among its associated IPGW instances. In the case of one IPGW instance associated with one virtual CRO, the procedure is simply strait forward. In the case of multiple IPGW instances, the CRO calculates overall demand and the weighted (e.g., by throughput) average spectrum efficiency for multiple IPGW instances associated with a TG.

The applicable IPGW receives that allocated bandwidth, and the IPGW assigns the allocated bandwidth to the individual terminals making up the TG, and sends traffic to the CRO. As to QoS on the TG level, each TG may have its own QoS requirements, which can be used by each terminal making up that TG.

Figure 3:
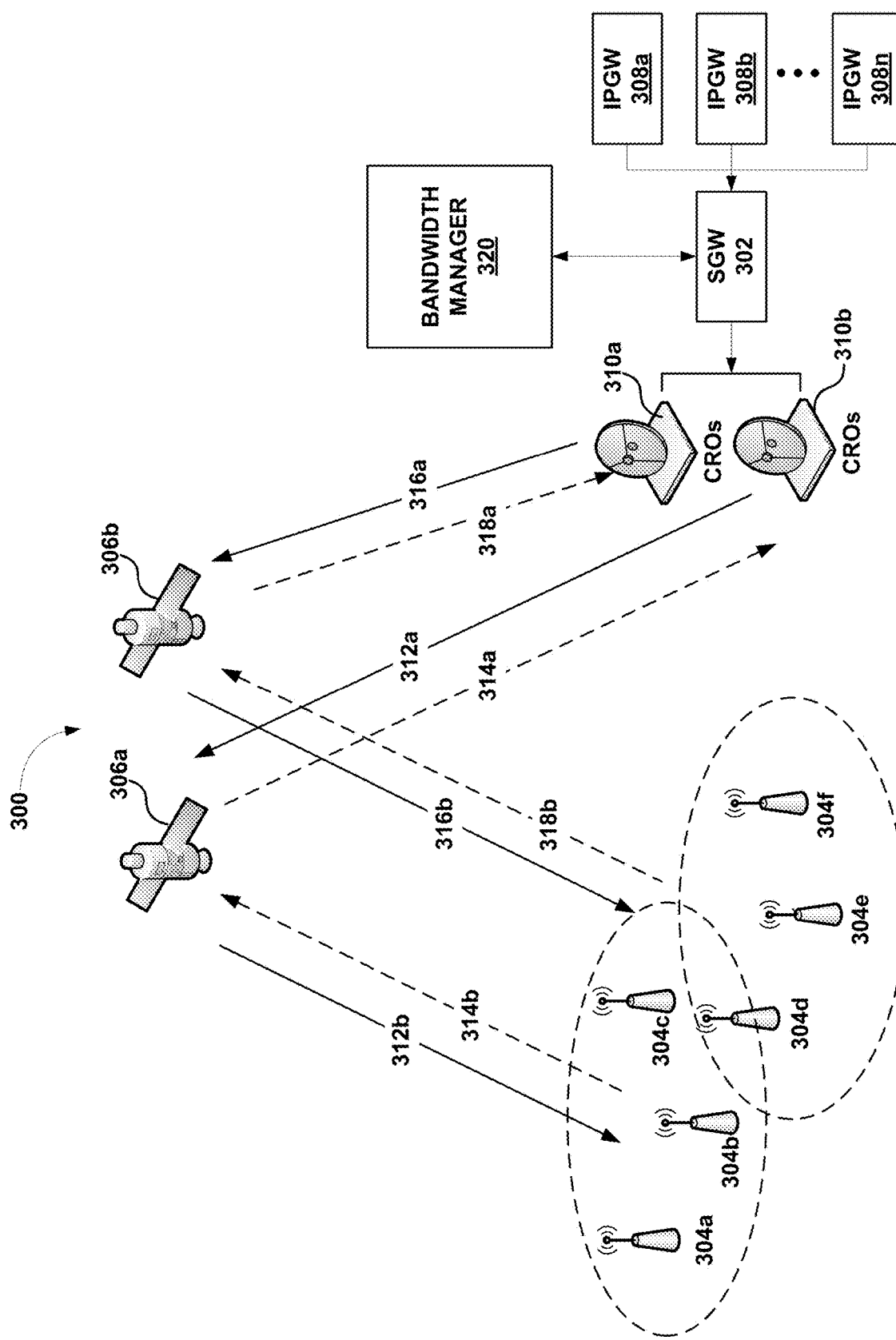
FIG. 3 illustrates an example multi-satellite data transmission system in which dynamic bandwidth allocation in accordance with various embodiments may be implemented.

FIG. 3 illustrates an example of a multi-IPGW, multi-CRO satellite network 300 in which various embodiments of the present disclosure may be implemented. Satellite network 300 can include an SGW 302, remote terminals 304a-304f, two satellites 306a and 306b, IPGWs 308a-308n, and RF terminals 310a and 310b (which can be associated with multiple CROs at SGW 302). Similar to satellite network 100 of FIG. 1, the example satellite network 300, may be a shared access broadband network. Other types of shared access networks may include, for example, wireless networks such as $4^{th}$ Generation Long Term Evolution (4G LTE) and WiMAX networks, which may include terminals other than VSATs, such as cellular and WiFi equipped devices.

SGW 302 may be connected to remote terminals 304a-304f via satellites 306a and 306b. It should be noted that a TG may include any remote terminals receiving beams from either satellite 306a or 306b. Feeder links may carry data between SGW 302 and satellites 306a and 306b, and may include: forward uplinks 312a and 316a for transmitting data from SGW 302 to satellites 306a and 306b, respectively; and return downlinks 314a and 318a for transmitting data from satellites 306a and 306b, respectively, to SGW 302. User links may carry data between satellites 306a and 306b and remote terminals 304a-304f, and may include: return uplinks 314b and 318b for transmitting data from remote terminals 304a-304f to satellites 306a and 306b, respectively; and forward downlinks 312b and 316b for transmitting data from satellites 306a and 306b, respectively, to remote terminals 304a-304f. Forward uplinks 312a, 316a and forward downlinks 312b, 316b may form an outroute, and return uplinks 314b, 318b and return downlinks 314a, 318a may form an inroute. SGW 302 may be part of satellite earth stations with connectivity to ground telecommunications infrastructure. RF terminals 310a and 310 may be the physical equipment responsible for sending and receiving signals to and from satellites 306a and 306b, respectively, and may provide air interfaces for SGW 302.

Each of remote terminals 304a-304f can be connected to one or more VSATs and may connect to an internet through satellites 306a and/or 306b and SGW 302. Satellites 306a and 306b may be any suitable communications satellites (similar to satellite 106 of FIG. 1). Again, signals passing through satellites 306a and/or 306b in the forward direction may be based on the DVB-S2 standard, for example, while the signals intended to pass through satellites 306a and/or 306b in the return direction may be based, for example, on the IPoS standard. Other suitable signal types may also be used in either direction.

IPGWs 308a-308n can be similar to IPGWs 108a-108c of FIG. 1, and may be an ingress portion of the local network at SGW 302. IP traffic, including TCP traffic, from the internet may enter SGW 302 through IPGWs 308a-308n. The bandwidth of RF terminals 310a and 310b can be shared amongst IPGWs 308a-308n. At each of IPGWs 308a-308n, RT and NRT traffic flows may be classified into different priorities, and may be processed and multiplexed before being forwarded to priority queues at SGW 302. Data from an internet intended for remote terminals 304a-304f (e.g., VSATs) may be in the form of IP packets, including TCP packets and UDP packets, or any other suitable IP packets. This data may enter SGW 302 from any one of IPGWs 308a-308n. The received IP packets may be processed and multiplexed by SGW 302 along with IP packets from the other ones of IPGWs 308a-308n. The IP packets may then be transmitted to satellites 306a and/or 306b, and satellites 306a and/or 306b may then transmit the IP packets to the VSATs. Similarly, IP packets may enter the network via the VSATs, be processed by the VSATs, and transmitted to satellites 306a and/or 306b. Satellites 306a and/or 306b may then send these inroute IP packets to SGW 302. It should be noted that because the spectrum can be segmented for one beam, meaning a particular satellite beam could have one or multiple CROs, the Multi-IPGW Multi-CRO model would be generally applicable to a system with a single beam or multiple beams under the coverage of one or multiple satellites.

In various embodiments, a bandwidth manager 320 can be included to manage or coordinate bandwidth allocation on the shared network. Bandwidth manager 320 may be implemented, for example, as a centralized bandwidth manager to allocate available bandwidth among the various TGs. As seen in the example of FIG. 3, bandwidth manager 320 can be configured to interface with SGW 302 to receive information about traffic flows in the network, and to provide control messages to control the utilization or allocate the utilization of resources among the terminal groups. Accordingly, in various embodiments, the bandwidth manager 320 can be configured to receive information from the CROs (e.g. via SGW 302) that includes an estimated bandwidth for the terminal groups communicating through that CRO, together with demand requests and the spectrum efficiencies for each IPGW instance 308a-308n. The bandwidth manager 320 can be configured to partition the bandwidth for multiple CRO's, and allocate the bandwidth at each CRO across multiple TGs. Accordingly, based on the bandwidth allocated from the bandwidth manager, the CRO can be configured to further allocate its allotted bandwidth among its corresponding IPGW instances 308a-308n.

In various embodiments, bandwidth manager 320 can be configured to perform resource allocation for TGs in the Multi-IPGW Multi-CRO satellite network 300 while maintaining the advantages of per-terminal bandwidth allocation in the Multi-IPGW Single-CRO satellite network 100. That is, bandwidth allocation can be optimized across TGs as well as per individual terminals in accordance with various embodiments.

Figure 4:
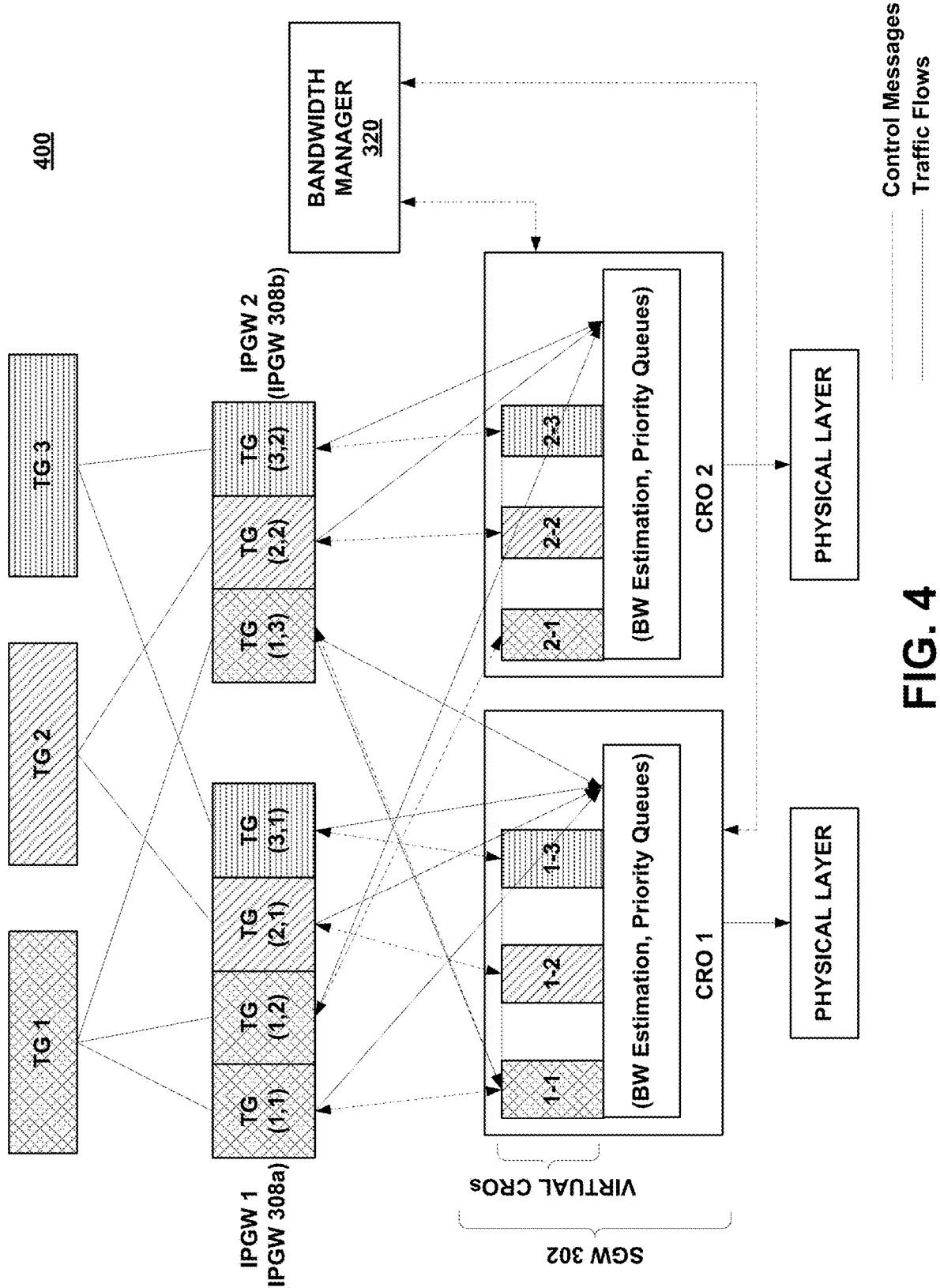
FIG. 4 is a diagrammatic representation of a multi-IPGW, multi-CRO traffic model for terminal groups in the multi-satellite data transmission system of FIG. 3.

FIG. 4 is a diagram illustrating an example of a centralized bandwidth manager in a multi-IPGW, multi-CRO model 400. In the example illustrated in FIG. 4 illustrates there are three TGs (TG 1, TG 2, and TG 3), two physical IPGWs (IPGW 1 and IPGW 2) and two CROs (CRO 1 and CRO 2). It should be noted, however, that various embodiments can be implemented to achieve bandwidth allocation for any number of TGs, IPGWs, and/or CROs.

Further in this example, each of the TGs (TG 1, TG 2, and TG 3) may communicate through both of the IPGWs (IPGW 1 and IPGW 2). Similarly, each of the IPGWs (IPGW 1 and IPGW 2) may communicate with either CRO 1 or CRO 2. Additionally, IPGW 1 and IPGW 2 may each run several IPGW instances that may be associated with different TGs. FIG. 4 illustrates an example in which each TG runs several IPGW instances that can be associated with two different physical IPGWs. That is, and for example, TG 1 runs its IPGW instances TG(1,1), TG(1,2) and TG(1,3) at two different physical IPGWs. TG 1's instances TG(1,1) and TG(1, 3)) are run at IPGW 1 and IPGW 2, respectively, and can be associated with CRO 1 via virtual CRO 1-1, while instance TG(1,2) is run at IPGW 1 and can be associated with CRO 2 via virtual CRO 2-1.

Comparing the multi-IPGW, single-CRO model 200 (FIG. 2) with the multi-IPGW, multi-CRO model 400, it can be appreciated that in the multi-IPGW, multi-CRO model 400, the data flow of some terminals of TG 1, i.e., IPGW 1's TG(1,1) and IPGW 2's TG(1,3) to virtual CRO 1-1, forms a multi-IPGW, single-CRO model 200. Accordingly, and as alluded to above, the flow control algorithms applicable to the multi-IPGW, single-CRO model 200 can be directly applied to this aspect of the multi-IPGW, multi-CRO model 400. However, the capacity of one physical CRO (e.g., CRO 1) may be partitioned among several virtual CROs (e.g., CRO 1-1, CRO 1-2, CRO 1-3), and with QoS constraints and throughput limitations on the TG, centralized bandwidth management performed by bandwidth manager 320 may be implemented (e.g., as shown in FIG. 4) in various embodiments to control traffic.

Within a CRO, bandwidth allocation can be performed across IPGW instances of the same TG as illustrated in FIG. 4, where the available bandwidth (in kbps) can be assigned by bandwidth manager 320. As shown in FIG. 4, one IPGW instance can communicate with one CRO, while one CRO can exchange messages with multiple IPGW instances. Accordingly, one IPGW instance can send data to one CRO. If a TG needs to send data to two CROs, two IPGW instances may be created (as is illustrated for TG1).

Figure 5A:
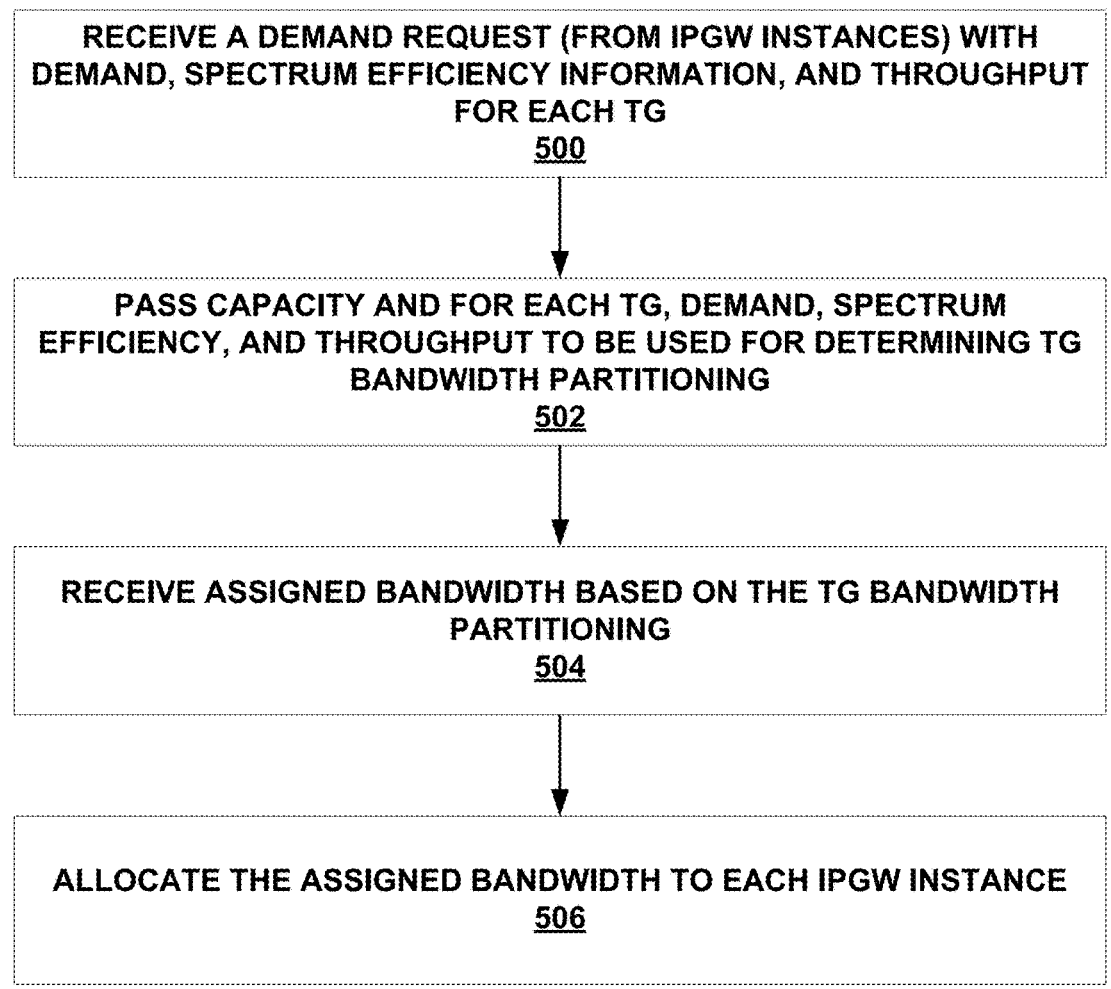
FIG. 5A is a flow chart illustrating example operations performed for TG bandwidth partitioning at the CRO-level in accordance with various embodiments.

FIG. 5A is a flow chart illustrating example processes for centralized bandwidth management from a CRO-perspective in accordance with various embodiments. At operation 500, the CROs receive demand requests from the IPGW instances with demand, spectrum efficiency information, and throughput for each TG. Again, spectrum efficiency can reflect the averaged channel condition among remote terminals associated with a particular TG's IPGW instance. Particularly, the CRO's can receive demand requests for any or all of the terminal groups associated with the network and these can be received via one or more of the IPGWs in the network. In terms of the example illustrated in FIG. 4, CRO 1 receives this information (e.g. via its virtual CRO's) for each of terminal groups TG1, TG2, TG3, from both IPGW1 and IPGW2. Likewise CRO 2 also receives its information (e.g. via its own virtual CRO's) for each of terminal groups TG1, TG2, TG3, from both IPGW1 and IPGW2.

Accordingly, as this example illustrates, in a multi-IPGW, multi-CRO environment, situations can exist in which a given CRO does not have sufficient data to determine the overall bandwidth requirements of the network, or even, potentially, the bandwidth requirements of a given TG. Therefore, in various embodiments, each CRO can be configured to share this information with the bandwidth manager (e.g. bandwidth manager 320) so that the bandwidth manager can assess. This assessment can determine the overall demands of the network in view of service levels and QoS requirements for the various subscribers and services. From this, the bandwidth manager can allocate network resources considering all of the demands of those resources and the availability of those resources in a centralized fashion.

At operation 502, each CRO passes its capacity and for each TG demand, spectrum efficiency and throughput to the bandwidth manager. It should be noted that the spectrum efficiency measurement may be subject to some pre-processing. As described above, the bandwidth manager receives this information from each CRO and correlates it to determine consolidated demand and spectrum efficiency information for each TG. The bandwidth manager used consolidated data, available capacity and allocates resources per the subscribed rate plan as will be discussed in greater detail below. The allocation can in some embodiments consider QoS and other service level commitments. The bandwidth manager delivers the allocations to the CROs so that they may be implemented. Accordingly, the bandwidth manager can perform TG bandwidth partitioning in a multi-IPGW, multi-CRO satellite network, where the bandwidth manager can perform bandwidth partitioning of multiple CROs, resulting in some assigned bandwidth (in kbps) for each CRO for multiple TGs.

At operation 504, the CROs may receive the assigned bandwidths determined by the bandwidth manager based on the bandwidth partitioning performed by the bandwidth manager. Using the assigned bandwidth received from the bandwidth manager, the CRO nodes (or the virtual CROs) may calculate bandwidth allocations to be assigned among its associated IPGW instances. In one embodiment, the bandwidth manager simply allocates bandwidth amongst the various CRO's and it is up to the CRO's to allocate bandwidth among its associated IPGW instances. In other embodiments, the bandwidth manager can take a more granular approach, and allocate bandwidth across the IPGW instances.

At operation 506, the CRO can allocate the assigned bandwidth to each IPGW instance. In particular, the CRO may calculate the overall demand for resources and a weighted (by throughput) average spectrum efficiency for the multiple IPGW instances associated with each TG. Accordingly, and once the allocated bandwidth is obtained, each IPGW instance schedules the respective terminals of the appropriate TG and sends traffic to the respective CRO (as illustrated in FIG. 4). It should be noted that communications among the IPGW instances, the CROs, and the bandwidth manager can occur, for example, at every (pre-defined) flow control interval. In accordance with some embodiments, this pre-determined flow control interval may be every 100 ms, where the data flow is continuous as the scheduler at each IPGW instance can run every 20 ms, although other time intervals can be used.

As described above, the bandwidth manager may be configured to perform bandwidth partitioning. To achieve such bandwidth portioning, the bandwidth manager can include a processing module configured to run a bandwidth partitioning algorithm. As discussed in greater detail below, this bandwidth partitioning algorithm can be applied to interactive, streaming, bulk, as well as other traffic classes (known or future) based on a "proportional fair" scheduling scheme. For multiple TGs, however, the proportional fair algorithm in various embodiments aims to partition the bandwidth of the outroute to TGs in a way such that the average capacity allocated to a TG is proportional to its corresponding configured maximum subscription rate across all the TGs. Moreover, the bandwidth partitioning algorithm can incorporate a TG's configured maximum subscription rate, a token bucket mechanism, as well as a maximum throughput limit. A preference weight may also be considered in the event that certain TGs are weighted as being of greater importance. Accordingly, an average throughput of a TG proportional to its configured maximum subscription rate can be achieved. Additionally, and when appropriate, the bandwidth partitioning algorithm can partition bandwidth in favor of those TGs with a higher preference weight.

FIG. 5B is a flow chart illustrating example processes for bandwidth partitioning in accordance with various embodiments. As described above, the bandwidth manager may receive certain information from a CRO upon which bandwidth partitioning at the TG-level can be determined. For example, in various embodiments, the centralized bandwidth manager may receive demand, spectrum efficiency information, CRO capacity, and throughput from the CROs. Accordingly, and at operation 520, a CRO-level bandwidth allocation can be determined for a TG in accordance with a pre-configured subscription rate. That is, an initial allocation for the CROs can be determined based upon this information received from the CROs.

At operation 522, the CRO-level bandwidth allocation can be adjusted based on NRT traffic capacity of the applicable CRO associated with a TG, and a configured minimum bandwidth requirement for the TG. It should be noted that the NRT capacity (e.g., outroute traffic distribution) can take into account assigned weights associated with a particular traffic type at the CRO, e.g., interactive, streaming, or bulk traffic. Moreover, the minimum bandwidth requirement can be considered by allocating the minimum bandwidth to each TG, and then assigning leftover bandwidth to TGs proportionally per the priority of the TG and the subscription rate plan of the TG.

At operation 524, bandwidth allocation is calculated for the TG based on the adjusted CRO-level bandwidth allocation and demand request associated with the TG. As previously described, the demand request can be passed to the bandwidth manager from applicable CROs. Again, various embodiments are directed to bandwidth partitioning for each TG while still ensuring that the assigned bandwidth to each TG meets a maximum subscription rate (or at least, is proportionally fair to the TG during times of network congestion).

Examples of an algorithm and corresponding calculations for performing the aforementioned processes for bandwidth partitioning are now described in detail. First, N TGs can be considered, denoted herein as TG(i), i=1, . . . , N. Each TG may have one or more IPGW instances connected to a single CRO. Although applicable variables from the perspective of one CRO are discussed, such variables can be repeated in the case of multiple CROs. $N_i$ can be indicative of the number of IPGW instances (also referred to herein as "Instance") for TG(i) to feed traffic to the CRO. $Q_i^{(k)}$ can denote a demand vector from TG(i)'s k-th Instance to the CRO, k=1, . . . , $N_i$. In the case of one CRO supporting one IPGW instance, $N_i$=1.

Assuming M traffic types (by default, M=3, which can be representative of the interactive, streaming, and bulk traffic classes, but other values may be accommodated), the demand vector from TG(i)'s k-th Instance (at the corresponding CRO) is described as $$Q_i^{(k)}=[Q_i^{(k)}(1), \ldots, Q_i^{(k)}(M)].$$

The CRO offered NRT capacity, λ, can be written in vector form as $$\lambda=[\lambda(1), \ldots, \lambda(M)]=[w_1\lambda, \ldots, w_M\lambda],$$

where $w_m$, m=1, . . . , M, is the assigned weight for traffic type m at the CRO. It should be noted that the CRO is also able to estimate bandwidth usage at the CRO or at each IPGW instance. Subject to the particular implementation, the RT usage of the CRO can also be reported to the bandwidth manager.

The weights for the traffic class (discussed in greater detail below) can also be separately defined for each TG. They may or may not take the same value as those at the CRO level.

A TG may have some required minimum bandwidth of the network allocated to it, and thus a portion of the bandwidth is allocated at each associated CRO. The required minimum portion of bandwidth at each CRO is also discussed in further detail below. $R_{min}(i)$ can refer to that required minimum portion of the bandwidth or rate at TG(i) supported by the corresponding CRO, and $\lambda_{ADJ}$ can refer to the adjusted NRT rate after deducting the required minimum bandwidth, resulting in $$\lambda_{ADJ} = \lambda - \sum_{i=1}^{N} R_{min}(i).$$

Considering demand requests, the actual CRO-offered bandwidth for lower priority classes may be smaller so that bandwidth is not wasted when there is less demand for one priority than that of the weighted portion of total bandwidth. Denoting G=[$G_1$, . . . , $G_M$] as the adjusted CRO offered bandwidth, the following backward equations are:
for priority m=2, . . . , M, $$G_m = \min[w_m\lambda_{ADJ}, \text{all } BW \text{ requests for priority } m]$$
$$= \min\left[w_m\lambda_{ADJ}, \sum_{i=1}^{N}\sum_{k=1}^{N_i} Q_i^{(k)}(m)\right]$$

for priority 1, $$G_1 = \lambda_{ADJ} - \sum_{m=2}^{M} G_m.$$

$C_{i,TG}$=[$C_i(1)$, . . . , $C_i(M)$] can be used to represent the allocated bandwidth for TG i with respect to priorities 1 through M, where $C_i(m)$ is the bandwidth assignment for priority m.

Further, $C_i^{(k)}$=[$C_i^{(k)}(1)$, . . . , $C_i^{(k)}(M)$] can denote the CRO assigned bandwidth (to be performed by the bandwidth manager) to TG(i)'s k-th Instance with respect to traffic types 1 to M. The task of the bandwidth partitioning algorithm is to calculate the needed bandwidth for each Instance of the TGs, i.e., to calculate $C_i^{(k)}$=[$C_i^{(k)}(1)$, . . . , $C_i^{(k)}(M)$] by taking inputs of $Q_i^{(k)}$=[$Q_i^{(k)}(1)$, . . . , $Q_i^{(k)}(M)$] and G=[$G_1$, . . . , $G_M$], while in the meantime, assuring that the assigned bandwidth to each TG meets the configured maximum subscription rate, or is proportionally fair when the network is congested. In addition, subject to configuration, the spectrum efficiency of a TG will be counted at the bandwidth partitioning by the bandwidth manager.

This can entail multiple operations. A first operation can be to apply bandwidth partitioning algorithm and obtain $C_{i,TG}$=[$C_i(1)$, . . . , $C_i(M)$], i=1, . . . , N, for all TGs. A second operation can be to plug in the obtained $C_{i,TG}$=[$C_i(1)$, . . . , $C_i(M)$] to an existing algorithm, such as that described above that applies to per-terminal bandwidth partitioning, to get $C_i^{(k)}$=[$C_i^{(k)}(1)$, . . . , $C_i^{(k)}(M)$] for each IPGW instance.

It should be noted that bandwidth partitioning algorithm can apply a proportional fair rule such that each TG receives an allocation of bandwidth proportional to the configured maximum subscription rate. Additionally, the bandwidth partitioning algorithm can assure weighted priorities for the different traffic types such that high priority interactive traffic can experiences low latency, while low priority traffic (e.g., bulk traffic) is not starved. Among multiple TGs, and given the inputs from the IPGW instances and the CRO, the bandwidth partitioning procedures can be either partially done (i.e., variables are pre-processed) at the CRO(s) and then completed at the bandwidth manager, or entirely done at the bandwidth manager.

Bandwidth allocation inside a TG for one CRO can be performed, for example, as described in U.S. Patent Publication No. 2013/0135996. That is, a packet delay measurement may be calculated, an overall rate allocation may calculated, and subsequently, bandwidth allocations can be calculated for each IPGW, wherein the output of the bandwidth partitioning algorithm can be used as the input for the TG bandwidth allocation calculation.

For multiple TGs, however, the proportional fair algorithm may be implemented to attempt to partition the bandwidth of the outroute to TGs in a way such that the average capacity allocated to a TG is proportional to its corresponding configured maximum subscription rate across all the TGs. FIG. 6 illustrates example processes performed for bandwidth partitioning in accordance with a proportional fair principle. At operation 600, the maximum bandwidth allocation limit for each TG is determined. Each terminal group has a maximum subscription rate limit, denoted as $A_i$, i=1, ..., N, (also referred to as "Maximum Rate"). The rate limit is imposed to each TG at run-time.

At operation 602, an exponential moving average (EMA) can be calculated for an allocated bandwidth of a TG at some time (if there is an allocated bandwidth). That is, the average assigned bandwidth for the i-th TG can be $S_i$, while the instant assignment can be $R_i$, i=1, ..., N. The unit can be in bytes per bandwidth allocation period, or bits per second, whichever is convenient. The default value for the allocation period=100 ms, which is the same as an IPGW-CRO allocation period. The EMA for the allocated bandwidth at time t of TG i can then be expressed as $$S_i(t)=\alpha \cdot R_i(t)+(1-\alpha)\cdot S_i(t-1),$$

where $\alpha$ is a smoothing factor determining the filter equivalent time constant. If the allocation period is T, then the time constant $\tau$ of EMA equals $$-\frac{T}{\ln(1-\alpha)}$$

($\alpha$=0.1 is equivalent to time constant $\tau \approx 10$ when T=1 period). If at period t there is no allocated bandwidth for TG i, then $R_i(t)$=0. The average allocation vector can be defined as $S(t)=[S_1(t), \ldots, S_I(t)]$, and the instant allocation rate vector can be defined as $R(t)=[R_1(t), \ldots, R_I(t)]$, where I is the number of TGs.

At operation 604, a sorting ratio is calculated based on a TG's subscription rate and weight as well as the estimated spectrum efficiency and throughput for its respective CRO and assigns bandwidth to the TG with the smallest ratio. That is, the bandwidth manager sorts the ratio, $r_i(t)=S_i(t)/A_i(t)$, at every period or multiple periods in ascending order, and assigns the bandwidth to the TG with the smallest ratio. If there are any resources left, the remaining bandwidth can be assigned to the TG with the second smallest ratio. This "greedy filling" scheme can be continued until the maximum bandwidth allocation limit is achieved for a certain TG or the available bandwidth runs out. It should be noted that the maximum bandwidth allocation limit need not necessarily be the same as the configured maximum subscription rate. Once the bandwidth is assigned, the bandwidth manager updates the above average bandwidth assignment formula. TGs that are not scheduled at time t are given zero values.

Generally, the TGs obtain their respective configured maximum subscription rates. However, due to bandwidth fluctuation in a wireless network, as well as potential oversubscription, the network may encounter congestion from time to time. It may be preferable for the system to provide a reasonably higher throughput to those preferred TGs during such congestion periods. Thus, an index can be introduced, i.e., the priority of TG or Preference Factor, for each TG, denoted as $g_i$, where i=1, ..., I, N is the number of TGs.

If bandwidth allocation is proportional to the TG's configured maximum subscription rate, then $g_i$=1, where i=1, ..., N. As an index, $g_i$ can be configurable and allows a service operator to give preference to a TG with one or several times what it is supposed to get in terms of bandwidth from the network resource during congestion. Thus, the sorting ratio can be further defined as $$r_i(t) = \frac{S_i(t)}{g_i A_i}.$$

The default values of the Preference Factor are one (1.0) for all TGs.

For TGs, spectrum fairness (as will be described below) is considered. The essence of fairness in spectrum is that each TG is fairly treated with regard to spectrum usage during bandwidth partition. This could result in a throughput difference (in kbps) even if two TGs have the same rate plan due to their overall channel conditions.

When spectrum fairness is enabled, the sorting ratio can be further defined as $$r_i(t) = \frac{S_i(t)/\psi_i}{g_i A_i},$$

where $\Psi_i$ is the spectrum efficiency (in bits/symbol).

For multiple CROs, L can be the number of outroutes, and $S_i^{(v)} \Psi_i^{(v)}$ can be the throughput and (averaged) spectrum efficiency of TG i in CRO v, v=1, ..., L. Thus, the ratio for TG i can be defined as $$r_i(t) = \frac{1}{g_i A_i}\left(\frac{S_i^{(1)}}{\psi_i^{(1)}} + \ldots + \frac{S_i^{(L)}}{\psi_i^{(L)}}\right).$$

It should be noted that the above formula is generic to L since if a TG does not use a CRO, its throughput is zero. The feature of spectrum fairness can be turned on or off. Therefore, for v=1, ..., L, where L is the number of CROs, and i=1, ..., N, and where N is the number of TGs, if spectrum fairness is ON, all $\Psi_i^{(v)}$'s take the calculated values. If the spectrum fairness feature is OFF, all $\Psi_i^{(v)}$'s are set to 1.0. $\Psi_i^{(v)}$ can be the averaged spectrum efficiency of TG i at CRO v.

Furthermore, a coefficient can be introduced to $\Psi_i^{(v)}$ in order to implement the ON/OFF effect in a smoother fashion. That is, $w_s$ ($0 \leq w_s \leq 1$) can be a weight. The upper and lower bound of $\Psi_i^{(v)}$ can be $\Psi_{upper}$ and $\Psi_{lower}$, respectively. The weighted spectrum efficiency for TG i at CRO v would then be $$\Psi_{TG,i}^{(v)}=\max[\Psi_{lower},\min[\Psi_{upper}, w_s \Psi_i^{(v)}]],$$

where $\Psi_i^{(v)}$ is the estimated average value. By default, the upper bound $\Psi_{upper}$=4.5 and the lower bound $\Psi_{lower}$=1. With this setting, when $w_s$=0, $\Psi_{TG,i}^{(v)}$=1; when $w_s$=1, when $w_s$=1, $\Psi_{TG,i}^{(v)}$ (assuming the estimation is within the range). When $w_s$ changes from one to zero, the impact of using spectrum efficiency can be mitigated.

Based on above, the throughput ratio of TG i, i=1, ..., N, can be rewritten as $$r_i(t) = \frac{1}{g_i A_i}\left(\frac{S_i^{(1)}}{\psi_{TGi}^{(1)}}| \ldots |\frac{S_i^{(L)}}{\psi_{TGi}^{(L)}}\right),$$

where $\Psi_{TG,i}^{(v)}$ is the weighted spectrum efficiency for the i-th TG at the v-th CRO, v=1, . . . , L, where again, L is the number of CROs, and N can be the number of TGs. $S_i^{(v)}$ is the throughput (in kbps) of TG i at CRO v. $A_i$ is the maximum throughput (in kbps), and $g_i$ is the group priority factor (weight) for TG i.

Sorting may also be applied in accordance with various embodiments. Sorting in the proportional fair algorithm may be implemented in some embodiments to make the assignment (i.e., the partitioned bandwidth) proportional to the desired target starting from the steepest step. It particularly compensates a TG that could be underserved for some amount of time. While it is desirable to update the sort list every period (100 ms), since the throughput moving averaging could cover several (e.g., 10) periods, the performance of this scheme may be maintained even if the sorting period lasts more than a single period, e.g., a few periods long.

There can be two ways of updating the sorting list in accordance with various embodiments. In accordance with one embodiment, updating is performed periodically, i.e., the bandwidth manager keeps on using a sorting list for some time, so long as the update duration is sufficiently longer than the sorting time. In accordance with another embodiment, updating is performed continuously, i.e., the updated sort list applies to scheduling immediately.

Due to latency concerns, maximum updating periods can be applied. For example, and as the interactive traffic back-off delay can start at, e.g., 200 ms, the updating period for sorting can be the same. Thus, the default updating period may be one or two periods, with one period equaling 100 ms. As the number of TGs generally remains static, no TG changes (active or inactive) are expected during sorting time, and thus, bandwidth partitioning need only be updated at the start of a new period.

At any time t, bandwidth allocation can be based on the current sort list allowing a TG on top of the list to aggressively use the allocated bandwidth until either the maximum subscription rate limit is reached, or until all the bandwidth requests from this TG are committed. Any remaining bandwidth can then be assigned to the next TG in the list. This same sort list can apply to each priority, but there can be different end positions in each 100 ms period. Such procedures are repeated in each priority in a "round robin" fashion until a new updated sort list comes into use.

Bandwidth partitioning can consider a minimum bandwidth allocation (as alluded to previously), and therefore, bandwidth partitioning can be accomplished by allocating a minimum bandwidth to each TG, and thereafter, proportionally allocating any leftover/remaining bandwidth to TGs based on TG priority and maximum subscription rate plan. It should be noted that the sum of the minimum bandwidth component across a TG is less than or equal to the offered capacity across all CROs, where the (minimum) offered capacity for each CRO is calculated using, e.g., a configurable and conservative code rate.

Regarding minimum bandwidth allocation, NRT traffic demand for any given TG can vary from one CRO to another (where CROs report RT and NRT bandwidth separately). Thus, the minimum bandwidth configured at the network/system level is further split and offered across CROs. Again, N can designate the number of TGs and L can designate the number of CROs involved. $R_{Min,i}$ can be the minimum configured NRT rate of the i-th TG (i=1, . . . , N) for interactive, streaming and bulk traffic classes. $D_{i,total}$ can be the total demand of the i-th TG across CROs, and $D_{ij}$ can be the demand from the i-th TG at the j-th CRO, i=1, . . . N, j=1, . . . , L.

The run-time minimum assigned bandwidth for the i-th TG at the j-th CRO may be calculated as follows:

$$R_{Min,ij} = R_{Min,i} \cdot (D_{ij}/D_{i,total}), i=1, \ldots, N, j=1, \ldots, L.$$

The total network level minimum configured NRT rate, $R_{min}$, is the summation of run-time minimum assigned bandwidths from all the TGs, i.e., $$R_{Min} = \sum_{i=1}^{N} R_{Min,i},$$

and is no more than the aggregate capacity offered by all CROs.

Yet another consideration in bandwidth partitioning in accordance with various embodiments, is that of maximum bandwidth allocation limits. That is, the maximum bandwidth allocation of a certain period can be capped for a TG based on the corresponding configured maximum subscription rate. This limitation, which can be referred to as the Maximum Allotment Limit, and can be managed in every period or every few periods. This may be achieved by utilizing a token bucket mechanism, which checks that data (packet) transmissions conform to defined bandwidth limitations and burstiness, in this instance, the maximum bandwidth allocation limits. A deeper bucket size could result in a much higher assigned instant bandwidth (throughput rate), meaning potentially higher bandwidth utilization. However, to avoid unnecessary latency, the bucket size is set to be shallow, i.e., the period allowing a throughput burst is small.

In particular, R0 (bits/sec) can be set as the configured maximum subscription rate of a TG, T0 (ms) can be the bandwidth allocation period, and B0 can refer to the bucket size. The token bucket mechanism/scheme may allow up to B0=(K+1)*R0*T0 amount of data burst to be scheduled at any one time, where K (in periods) can be the number of periods allowed for accumulating bandwidth (or so-called credit).

At each period, the bandwidth manager assigns R0*T0 amount of bandwidth (credit) to the bucket. In the meantime, the bandwidth manager can allot up to B0 amount of bandwidth to the TG. The limiting period is set as K periods (perceived as bucket size), where K is a configurable parameter with a default value of K=1.

As a TG is served by one or more CROs, the offered B0 is split between CROs based on the demand from each CRO. If the aggregated demand across all CROs exceeds B0 then $$B0_{ij} = B0 \cdot (D_{ij}/D_{i,total}), i=1, \ldots, N, j=1, \ldots, L,$$

where again, N can be the number of TGs and L can be the number of CROs. $D_{i,total}$ is the overall demand of the i-th TG across CROs. $D_{ij}$ is the NRT demand of the i-th TG in the j-th CRO. Thus $B0_{ij}$ is the NRT bandwidth offered for i-th TG at j-th CRO. It should be noted that due to differing $D_{i,total}$ and $D_{ij}$ for different TGs over time, the bucket size, $B0_{ij}$, for different TGs at different CROs can be different. If the aggregated demand across all CROs for a TG does not exceed B0, then each CRO is allocated bandwidth based on the TG's demand $D_{i,total}$.

As previously described, a TG can provide both RT and NRT services. Because the CRO estimates both RT and NRT usage, the bandwidth used for TG bandwidth partitioning is NRT. Therefore, and to be in compliance with a TG's maximum subscription rate, the RT portion can be subtracted out. In practice, the CRO may be the only entity that is aware of the RT portion of overall traffic, but not the RT portion for a particular TG. At the system level, the Admission Control Unit (ACU) for RT traffic can infer the RT portion of each TG assuming symmetrical RT traffic volume. Therefore, φ can be the CRO estimated RT portion of overall traffic, and $\varphi_i$ can be assumed to be the RT portion of a TG i, i=1, . . . , N. $R_0^{(i)}$ and $R_{0,NRT}^{(i)}$ can refer, respectively, to the configured maximum subscription rate and the bandwidth manager allocated rate for TG i and for this particular CRO. Accordingly, the allocated rate for a TG can be calculated using either of the following equations $$R_{0,NRT}^{(i)} = R_0^{(i)}(1-\varphi), i=1, \ldots, N; \quad (1)$$

$$R_{0,NRT}^{(i)} = R_0^{(i)} - \varphi_i \cdot \varphi \cdot R_{Est,CRO}, i=1, \ldots, N \quad (2)$$

where $R_{Est,CRO}$ can refer to the CRO estimated total bandwidth. It should be noted that calculations based on the first equation rely on information known at the CRO level only, whereas calculations based on the second equation rely on the aforementioned CRO estimated total bandwidth with the assistance of the ACU (which again, can infer the RT portion of each TG). If the CRO is able to evaluate $\varphi_i \cdot \varphi \cdot R_{Est,CRO}$ as a whole at the IPGW, various embodiments can rely on calculating the allocated rate for a TG using the second equation. Alternatively, and when φ is not available at the CRO, the CRO estimated RT portion of overall traffic can be set to 0 (i.e., φ=0) in the first and second equations.

Another consideration that can arise is that at the system level, a certain amount of bandwidth is reserved for one priority. For an individual TG, the TG's own high priority traffic may block access to bandwidth for that TG's lower priority traffic classes. Accordingly, for each TG and at the CRO level, a bucket splitting method can be applied to avoid such scenario.

That is, an initial credit in the bucket is assumed to be B(t) (this would be replaced by $B0_{ij}$ for i-th TG at j-th CRO).

For a "priority 1" traffic class, the following is calculated:

$$R_{max,1}(t) = B(t) - \text{Min}\left[B(t) \sum_{m=2}^{M} w_{TG(i)}(m),\right.$$

all requests from lower priorities], where $R_{max,1}(t)(R_{max,1}(t) >= 0)$ is the maximum amount that can be assigned to the priority 1 demand, $w_{TG(i)}(m)$ is a pre-assigned weight for priority m class of TG i, and M is the number of priorities. It should be noted that $w_{TG(i)}(m)$ is configurable per TG and used for each CRO. All requests from lower priorities can be expressed as $$\sum_{k=1}^{N_i} \sum_{m=2}^{M} Q_i^{(k)}(m),$$

and $Q_i^{(k)}(m)$ is the amount of request in the corresponding m-th priority from the k-th IPGW instance of TG v. Here, TG i is the corresponding TG in service. $N_i$ is the number of IPGW instances for TG i. A generic formula for the throughput limit of priority j for a particular TG i can be written as $$R_{max,j}(t) = B(t) - \sum_{m=1}^{j-1} R_{Alloc}(m) - \text{Min}\left[B(t) \sum_{m=j+1}^{M} w_m, \sum_{k=1}^{N_i} \sum_{m=j+1}^{M} Q_i^{(k)}(m)\right],$$

where $R_{max,j}(t) \geq 0$, $R_{Alloc}(m)$ is the actual allocated bandwidth for m-th priority at period t.

In addressing high priority TGs and leftover bandwidth, the overall outroute bandwidth can be efficiently used with proportional fair scheduling across terminals. However, scenarios may exists where a network operator may want override this behavior and allocate bandwidth to high priority TGs. In the event there are high priority TGs that may require specialized treatment, such TGs may be placed at the top of the sorting list (i.e., these TGs need not be considered during sorting. Accordingly, such high priority TGs may always receive their configured maximum subscription rate allocation of bandwidth, although the sum of configured maximum subscription rates for high priority TGs should not exceed the CRO capacity limit.

If the bandwidth allocated for a certain priority is not used up, it can be used for subsequent/lesser priority traffic classes. However, if the bandwidth allocated for one period is not used up, it is not generally conveyed to the next period, because the leftover bandwidth may not carry over across the flow control boundary.

If needed, embodiments may be configured such that leftover bandwidth can be distributed to TGs having residual demand using a round robin allocation with a block size (e.g., of 1 k bytes) until the residual demand of a TG is fulfilled, or the residual bandwidth runs out. The residual demand can be determined either by the difference of the bucket size and the allocated TG bandwidth, or the difference of the configured maximum subscription rate and the allocated bandwidth. To avoid unnecessary oscillation in the amount of allocated bandwidth during times of non-congestion, the residual demand is considered by using the difference of the configured maximum subscription rate and the actual allocated bandwidth. That is, the residual demand of TG (t, i) is as follows TG (t, i)=max [0, Maximum_Rate TG(i)–Allocation_BW_TG(t,i)], i=1, . . . , N, where N is the number of terminal groups. Maximum_Rate (i) can refer to the configured maximum rate (subscription plan rate) for a TG ("i=1, . . . , N" referring to TGs 1 to N), and Allocation_BW_TG (t,i) can refer to the allocated overall bandwidth for TG i at time t (on all CROs), where t is the index of allocation period.

An example of such a round robin scheme can be as follows. Considering four TGs, the TGs may have a residual demand [4 3 2 1]. If the total leftover bandwidth is 10 or larger, than all residual demand can be fulfilled. If the total leftover bandwidth is smaller than 10, e.g., 8, then starting from TG 1, the allocation of leftover bandwidth would be [3 2 2 1].

The total allocated bandwidth of each TG (Allocation_BW_TG(t,i), i=1, . . . , N) can be updated counting the allotment of the leftover bandwidth. In addition, the corresponding allocated bandwidth for each priority of TG i should also be updated based on weights, respectively. Delta_BW_TG(t,i) can be the allotment of leftover bandwidth for TG i, i=1, . . . , N, where N is the number of TGs, and t is the allocation period. That is:

Allocation_BW_TG(t,i)=Allocation_BW_TG(t,i)+Delta_BW_TG(t,i);

Allocation_BW_intv(t,i)=Allocation_BW_intv(t,i)+$w_{TG(i)}$(1)*Delta_BW_TG(t,i);

Allocation_BW_stream(t,i)=Allocation_BW_stream(t,i)+$w_{TG(i)}$(2)*Delta_BW_TG(t,i); and Allocation_BW_bulk(t,i)=Allocation_BW_bulk(t,i)+
   $w_{TG(i)}(3)$*Delta_BW_TG(t,i), where: Allocation_BW_TG(t,i) can refer to the allocated overall bandwidth for TG i at time t (on all CROs); Allocation_BW_intv(t,i) can refer to the allocated bandwidth for interactive traffic of TG i at time t; Allocation_BW stream (t,i) can refer to the allocated bandwidth for streaming traffic of TG i at time t; Allocation_BW_bulk(t,i) can refer to the allocated bandwidth for bulk traffic of TG i at time t; and $w_{TG(i)}(m)$, m=1,2,3, are the corresponding weights for interactive, streaming, and bulk traffic, respectively, for TG(i). It should be noted that the treatment of leftover bandwidth may be for CRO operation purposes.

Allocating out all of the bandwidth of a CRO can be done for fully utilizing the spectrum. For a single CRO case, the total allocated bandwidth for a TG may count the assigned leftover bandwidth for sorting, but this may not be the case when multiple CROs are at issue. This is because excess bandwidth in an underloaded CRO may overwhelm the TG's assigned bandwidth, resulting in starvation for this TG in overloaded CROs.

Traffic class priority among TGs may be different (for various reasons), and thus, may be considered as well in the context of bandwidth partitioning. The priority of a particular traffic class of a TG may or may not take the same value as that in a CRO. Hence, priority weighting is used to reserve some bandwidth for a particular traffic class such that its service will not be starved. Therefore, it is reasonable to have different weights for different TGs, as well for CROs.

In individual terminals, traffic priority weights can be set for the CRO in terms of interactive, streaming and bulk traffic classes. Various embodiments allow the flexibility for each TG to set its own traffic class priority as well. In bandwidth partitioning among TGs, the traffic class priority allows the network to reserve bandwidth for a traffic class according to its weight. Similarly, such TG-defined traffic priority can also be reflected in IPGW scheduling.

To provide another level of description, pseudo code for an example embodiment of the bandwidth partitioning algorithm described above is also provided. Additionally, and as discussed above, different traffic classes can be addressed for bandwidth partitioning in accordance with various embodiments, although more or fewer classes may be considered. From high priority to low priority, the traffic classes contemplated in the examples presented herein include interactive, streaming, and bulk traffic classes. For supporting TGs, the same three classes can be considered. Pseudo code describing algorithms addressing these traffic classes are also provided. The unit of bandwidth can be bytes (bits) per period, bits/sec, Megabits/sec, or Kilobits/sec. For ease of description, Table 1, which lists variables utilized in the bandwidth partitioning algorithm is provided below, where bytes/period is the unit of bandwidth used as an example.

TABLE 1

| Variable | Unit | Description |
| --- | --- | --- |
| Period | ms | The duration for IPGW-SGW bandwidth allocation, default value = 100 ms |
| K | period | Period for terminal group allocation limit, default value K = 1. |
| N | — | Number of terminal groups |
| L | — | Number of CROs |
| T | period | Time t at Bandwidth Manager/SGW representing bandwidth allocation period, default value = 100 ms |
| Maximum_Rate_TG(i), i = 1, . . ., N | bytes/frame | Configured Maximum rate (subscription plan rate) for a terminal group ("i = 1, . . ., N" refers to terminal groups 1 to N hereafter) |
| W = [w1, w2, w3] | N/A | Pre-assigned weights for Interactive, Streaming and Bulk classes, respectively, for the CRO. |
| Weight_TG(i, j), i = 1, . . ., N; j = 1, 2, 3. | N/A | Configurable weights for traffic classes (INTE, Streaming, Bulk) for TG i; j = 1, 2,3 for three classes. |
| T_sort | period | Duration in period to update the sort list, default value = 1 or 2, can be larger subject to how often the network runs into congestion |
| Sort_List(t) | | A link list of terminal groups that is used for bandwidth allocation operation at time t. Elements in the Sort_List: k = 1, . . ., N |
| Ratio(t, i) | | The ratio for terminal group i at time t for sorting |
| Weight_TG(i) | | The Preference Factor used in fair scheduling for terminal group i, i = 1, . . ., N. Also referreda s $g_i$ |
| Budget_TG(i), i = 1, . . ., N | byte | Equals to Configured Maximum rate of terminal group i in bytes/frame |
| Carryover_TG(t, i), i = 1, . . ., N | byte | Carryover bytes for all traffic of terminal group i at time t |
| Unused_TG(t, i), i = 1, . . ., N | byte | Unused resource for all traffic of terminal group i at time t |
| Max_Allocation_TG(t, i), i = 1, . . ., N | byte | Maximum allocation for all traffic of terminal group i at time t (this could be different from Maximum_Rate_TG(i)) |
| Allocation_BW_TG(t, i), i = 1, . . ., N | byte | Allocated overall bandwidth for terminal group i at time t (on all CROs) |
| EMA_Allocation_TG(t, i), i = 1, . . ., N | byte | Exponential moving Avg. for overall allocation of terminal group i at time t (on all CROs) |

TABLE 1-continued

| Variable | Unit | Description |
|---|---|---|
| Max_Rate_TG_CRO(i, v), i = 1, ..., N; v = 1, ..., L | byte | The rate portion of TG i at CRO v. i = 1, ..., N; v = 1, ..., L |
| Demand_Request_TG_CRO(i, v), i = 1, ..., N; v = 1, ..., L. | byte | The demand rate of TG i at CRO v. i = 1, ..., N; v = 1, ..., L. This is the summation of demand of all traffic priorities. |
| EMA_Allocation_TG_CRO(i, v), denoted as $S_i^{(v)}$, i = 1, ..., N; v = 1, ..., L | byte | Exponential moving Avg of Allocated rate for TG i at CRO v. Note this variable equals to EMA_Allocation_TG_CRO(t, i) at respective CROs. |
| Spectrum_Eff_TG_CRO(i, v), denoted as $\psi_i^{(v)}$ i = 1, ..., N; v = 1, ..., L | bits/symbol | The spectrum efficiency input from IPGW to CRO. Two (or three) decimal digits should be good enough. |
| $w_S$ | N/A | Weight applied to estimated spectrum efficiency; range = [0, 1]. |
| | | Variable for each CRO listed below |
| G(j), j = 1, ..., M, M = 3 | bytes/period | SGW offered bandwidth for priority j per allocation period |
| $R_{max}$(i) | bytes/frame | Calculated Maximum rate for terminal group i on CRO v |
| $R_{min}$(i) | bytes/frame | Calculated Minimum rate for terminal group i on CRO v |
| Max_intv(t, i), i = 1, ..., N | byte | Maximum allocation for interactive (priority 1) class at time t |
| Max_stream(t, i), i = 1, ..., N | byte | Maximum allocation for stream (priority 2) class at time t |
| Max_bulk(t, i), i = 1, ..., N | byte | Maximum allocation for bulk (priority 3) class at time t |
| Demand_Request_intv(t, i), i = 1, ..., N | byte | Demand request of terminal group i for interactive at time t |
| Demand_Request_stream(t, i), i = 1, ..., N | byte | Demand request of terminal group i for streaming at time t |
| Demand Request_bulk(t, i), i = 1, ..., N | byte | Demand request of terminal group i for bulk at time t |
| Available_BW(1, j), j = 1, 2, 3 | byte | Available bandwidth for priority j, j = 1, 2, 3 representing interactive, streaming, and bulk, respectively (same representation applied to other variables) |
| End_position(t, j), j = 1, ..., 3 | | The end position at the sort list at time t for priority class j |
| Allocation_BW_intv(t, i), i = 1, ..., N | byte | Allocated bandwidth for interactive of terminal group i at time t |
| Allocation_BW_stream(t, i), i = 1, ..., N | byte | Allocated bandwidth for stream of terminal group i at time t |
| Allocation_BW_bulk(t, i), i = 1, ..., N | byte | Allocated bandwidth for bulk of terminal group i at time t |
| Allocation_BW_TG_CRO(t, i), i = 1, ..., N | byte | Allocated overall bandwidth for terminal group i at time t (on this CRO) |
| EMA_Allocation_TG_CRO(t, i), i = 1, ..., N | byte | Exponential moving Avg. for overall allocation of terminal group i at time t (on this CRO) |
| Residual_BW_intv, Residual_BW_stream, Residual_BW_bulk | byte | The difference between available BW and the actually assigned to terminal groups for each priority class on this CRO |

The allocated rates based on the aforementioned scheduling are for high or low priority traffic for each individual TG. A single TG could have multiple IPGW instances, consisting of multiple demand requests of a certain priority. The bandwidth manager determines bandwidth partitioning at the priority level for one TG as a whole, and these results can be utilized as input parameters for the aforementioned capacity estimation, dynamic bandwidth allocation, and multi-class scheduling algorithms/modules.

For bandwidth partitioning, a "budget" of available bandwidth can be set to the maximum subscription rate. Any carryover bytes for all traffic in a particular TG can be considered as well. As previously described, an EMA is calculated for an allocated bandwidth of a TG at a given time. Thereafter, a sorting ratio may be calculated that considers spectrum efficiency, where a TG link list can be used as a scheduling sequence for the bandwidth allocation. Additionally, demand requests can be updated for each priority class on a CRO of a TG.

Accordingly, the pseudo code describing bandwidth partitioning is as follows, where t=1, 2, ... can be denoted as the period index for the on-going time. Each terminal group is identified by a TG ID with the associated Maximum rate, Maxmum_Rate_TG (i), i=1, ..., N.

** *State of Algorithm***
Denote t=1,2,... be the period index for the on-going time.
Each terminal group is identified by it TG ID with the associated Maximum rate, Maximum_Rate_TG (i), i=1,...,N.

-continued

At the terminal group level:
We set
    Budget_TG(i) = Maximum_Rate_TG (i), i=1,...,N.
For the variable of Carryover_TG (t, i), i=1,...N, we have
If t==1, Carryover_TG (t,i)=0; //or Carryover_TG(t,i)= Maximum_Rate_TG (i) for pre-assigned credit.
If $2 \le t < K$ $$\text{Carryover\_TG}(t,i) = \sum_{k=1}^{t-1} \text{Unused\_TG}(k,i)$$

else $$\text{Carryover\_TG}(t,i) = \sum_{k=t-K}^{t-1} \text{Unused\_TG}(k,i)$$

End
If t==1,
    EMA_Allocation_TG(t,i)=0;
Else
    EMA_Allocation_TG(t,i)=a*Allocation_BW_TG(t-1,i) + (1-a) *EMA_Allocation_TG(t-1,i);
End
//The default value for a is a=0.10 (between 0.10 to 0.25).
Calculate
Max_Allocation_TG(t,i) = Carryover_TG (t,i) + Budget_TG(i), i = 1,...,N;
For TG i at particular CRO v, the available rate portion is
Max_Rate_TG_CRO(i, v) =

$$\text{Max\_Allocation\_TG}(t,i) \cdot \frac{\text{Demand\_Request\_TG\_CRO}(i, v)}{sum(\text{Demand\_Request\_TG\_CRO}(i, v), v = 1, \ldots, L)}$$

//This means the rate portion at a CRO is proportional to the corresponding demand reported to the CRO.
For single or multiple CROs, calculate Ratio(t,i) of TG i, i=1,...,N, based on
$\psi_{TG, i}^{(v)} = \max[\psi_{lower}, \min[\psi_{upper}, w_S \psi_i^{(v)}]]$, $$\psi_{TG,i}^{(v)} = \max[\psi_{lower}, \min[\psi_{upper}, w_S \psi_i^{(v)}]],$$

$$r_i(t) = \frac{1}{g_i A_i} \left( \frac{S_i^{(1)}}{\psi_{TG,i}^{(1)}} + \ldots + \frac{S_i^{(L)}}{\psi_{TG,i}^{(L)}} \right).$$

$\psi_i^{(v)}$ be the throughput and (averaged) spectrum efficiency of TG i in CRO v, v=1,...,L. $\psi_{TG,i}^{(v)}$ is the weighted spectrum efficiency for i-th TG at v-th CRO, v=1,...,L. L is the number of CROs.
N is the number of TGs. $S_i^{(v)}$ is the throughput (in kbps) of TG i at CRO v. $A_i$ is the maximum throughput (in kbps), and $g_i$ is the group priority factor (weight) for TG i.
At t=1, apply an initial TG link list, and at t > 1, sort Ratio(t, i) in ascending order. Then use the TG link list as scheduling sequence for bandwidth allocation procedure as defined in below.
Suppose t0 is the starting time of sorting, and T_sort is the lock period of sorting.
During a sorting interval, the original scheduling sequence is used. If there are new terminal groups emerging, or existing terminal groups become idle (idle means not participating bandwidth allocation), the new comers are added to the front of the current scheduling sequence. The idle ones are moved out from the list. If no terminal groups moving in and out, the link list stays unchanged during the interval. When a new sort list comes into use, it should be updated by adding the new terminal groups and removing the idled ones during the past T_sort time. If the number of terminal groups is basically static, then there is no concern on the above.
What is described below is at per CRO basis, for CRO v, v=1,...,L.
At any time t, we have the following for each CRO:
{
Update the demand request for each priority class on CRO v of terminal group i, i=1, ...,N; that is update Demand_Request_TG_CRO(i,v), i=1,...,N; v belongs to 1,...,L
//this is done by summing the demand of each priority over all Instances of terminal group i, i.e., $$\sum_{k=1}^{N_i} Q_i^{(k)}(m), m \text{ is the particular priority.}$$

Calculate G(j), j=1,...,M, for CRO v. G(j) is the adjusted offered capacity of a CRO. M is the number of priorities.
//If a minimum bandwidth is required for each TG, G(j)'s should be adjusted by excluding the portion at each CRO. Method is provided in a previous section. The deducted amount should be added back to each TG after allocation so that the minimum portion is counted to the TG's throughput.
At any time t, bandwidth allocation is based on the current sorted list allowing a terminal group on top of the list aggressively uses the bandwidth until either the rate limit of TG i at this CRO is reached (Max_TG(t,i) for single CRO, Rate_TG_CRO(i, v) for multiple CROs, and v refers to this CRO) or all the demand requests (for a particular priority) are served.
The remaining bandwidth will then be assigned to the next terminal group in the list. This sorted list applies to each priority. Note only one single sorted list is used at NRT level for combined traffic. During the sorting interval, the end position of traffic scheduling in each period is recorded; such end position is used as the starting point for Round Robin in next period. Such procedures are repeated in each priority as Round Robin fashion until a new updated sort list comes into use.
For multi-period sorting, the sorted list is the same for all CROs, but the end position may be different for different CRO and different traffic priority class. For single period sorting, the sorted list is also the same for all CROs, but the end position does not matter as the sorted list will be reset in next period.

Interactive Class:
{
Available_BW(1,1)=G(1)
Available_BW_intv = Available_BW(1,1)
While Available_BW_intv >0
If the sort list is newly update
　Traverse sorting list starting from top, i.e., i=1, 2, ..., sequentially
Else
Traverse sorting list starting from End_position(t-1,1), i.e., i= End_position(t-1,1) sequentially
End $$\text{Max\_intv}(t,i) = R_{max}(i) - \text{Min}\left[R_{max}(i) \cdot \sum_{j=2}^{M} w_j, \sum_{k=1}^{N_i} \sum_{j=2}^{M} Q_i^{(k)}(j)\right];$$

Note $R_{max}(i)$=Max_Allocation_TG(t,i)- $R_{min}(i)$ for single CRO, $R_{max}(i)$ = Max_Rate_TG_CRO(i, v)- $R_{min}(i)$ for multiple CROs; j=2,...,M is for priorities 2 to M (M=3). $Q_i^{(k)}$ (j) is the amount of request data in j-th priority of k-th Instance of TG i.
　Allocation_BW_intv(t,i) = min [Max_intv(t,i), Demand_Request_intv (t,i), Available_BW_intv];

$$//\text{note Demand\_Request\_intv}(t,i) = \sum_{k=1}^{N_i} Q_i^{(k)}(j=1).$$

Available_BW_intv=Available_BW_intv- Allocation_BW_intv(t,i);
　If Available_BW_intv<=0, denote the end position of the list, End_position(t,1);
　If Available_BW_intv>=0 and all terminal groups are traversed, set end position to the top.
　For terminal groups that are not traversed at time t, assign zero bytes.
End //While
}
Residual_BW_intv = Available_BW(1,1)-sum(Allocation_BW_intv(t,i));
Available_BW(1,2)=G(2)+ Residual_BW_intv;
Available_BW_stream (priority 2)=Available_BW(1,2);
Max_stream(t,i) =

$$\max\left[0, R_{max}(i) - \text{Allocation\_BW\_intv}(t,i) - \text{Min}\left[R_{max}(i) \cdot \sum_{j=3}^{M} w_j, \sum_{k=1}^{N_i} \sum_{j=3}^{M} Q_i^{(k)}(j)\right]\right], i=1,...,N; M=3.$$

Streaming Class:
{
While Available_BW_stream >0
If the sort list is newly update
　Traverse sorting list starting from top, i.e., i=1, 2, ..., sequentially
Else
Traverse sorting list starting from End_position(t-1,2), i.e., i= End_position(t-1,2) sequentially
End
　Allocation_BW_stream(t,i) = min [Max_stream (t,i), Demand_Request_stream (t,i), Available_BW_stream];

$$//\text{note Demand\_Request\_stream}(t,i) = \sum_{k=1}^{N_i} Q_i^{(k)}(j=2).$$

Available_BW_stream =Available_BW_stream - Allocation_BW_stream (t,i);
　If Available_BW_stream <= 0, denote the end position of the list, End_position(t,2);
　If Available_BW_stream >= 0 and all terminal groups are traversed, set end position to the top.
　For terminal groups that are not traversed at time t, assign zero bytes.
End //while
}
Residual_BW_stream = Available_BW(1,2)-sum(Allocation_BW_stream (t,i));
Available_BW(1,3)=G(3)+ Residual_BW_stream;
Available_BW_bulk (priority 3)=Available_BW(1,3);
Max_bulk(t,i)=max[0, $R_{max}(i)$ - Allocation_BW_intv(t,i)- Allocation_BW_stream(t,i)], i=1,...,N.

-continued (Note we should use the following in this step if more lower priorities exist:
Max_bulk(t,i)=max[0, $R_{max}$(i) - Allocation_BW_intv(t,i)- Allocation_BW_stream(t,i)-

$$\text{Min}\left[R_{max}(i) \cdot \sum_{j=4}^{M} w_j, \sum_{k=1}^{N_i} \sum_{j=4}^{M} Q_i^{(k)}(j)\right]\right]; i=1,\ldots, N; \text{ if } M\geq 4.)$$

Bulk Class:
{
While Available_BW_bulk >0
If the sort list is newly update
 Traverse sorting list starting from top, i.e., i=1, 2, ..., sequentially
Else
 Traverse sorting list starting from End_position(t-1,3), i.e., i= End_position(t-1,3) sequentially
End
 Allocation_BW_bulk(t,i) = min [Max_bulk (t,i), Demand_Request_bulk (t,i),
Available_BW_bulk];

$$/\!/\text{note Demand\_Request\_bulk}(t,i) = \sum_{k=1}^{N_i} Q_i^{(k)}(j=3).$$

Available_BW_bulk =Available_BW_bulk - Allocation_BW_bulk (t,i);
 If Available_BW_bulk <= 0, denote the end position of the list, End_position(t,3);
 If Available_BW_bulk >= 0 and all terminal groups are traversed, set end position to the top.
 For terminal groups that are not traversed at time t, assign zero bytes.
End //while
}
Residual_BW_bulk = Available_BW(1,3)-sum(Allocation_BW_bulk (t,i));
//If Residual_BW_bulk>0, it may not be carried over to the next period.
//If during the scheduling course, one or more priority classes have run out of the total allocated
bandwidth, and Residual_BW_bulk>0, a second path scheduling should be arranged for those
particular priority classes in Round Robin until the leftover bandwidth is used out. This step may
not be needed as it is counted in procedure.
//Add a branch to treat residual bandwidth. A configurable parameter, Residual_BW_Alloc, can
be used (added in the //configuration table). If Residual_BW_Alloc is ON, distribute the residual
bandwidth to TGs up to each TG's $R_{max}$(i); //otherwise, no action on the residual bandwidth.
If the residual bandwidth on this CRO exists, i.e., Residual_BW_bulk>0, and
Residual_BW_Alloc is ON, allocate them to Allocation_BW_TG_CRO(t,i) in a Round Robin
way until $R_{max}$(i) is reached or the residual bandwidth runs out. The added bandwidth goes to
Interactive portion per TG. Update Allocation_BW_intv(t,i).
Allocation_BW_TG_CRO(t,i) =
 Allocation_BW_intv(t,i)+
Allocation_BW_stream(t,i)+Allocation_BW_bulk(t,i)+ $R_{min}$(i), i=1,...,N. // The minimum
portion is added back.
Output the allocated bandwidth per priority per terminal group on this CRO.
}// complete the operation of each CRO
Then at TG level,
Allocation_BW_TG(t,i)= sum (Allocation_BW_TG_CRO(t,i) for CRO v, v=1,...,L), i=1,...,N.
Unused_TG(t,i) = Budget_TG(i) − Allocation_BW_TG(t,i), i=1,...,N.
*End of Algorithm*

As described above, spectrum fairness is an important aspect to consider in the context of multiple TGs. That is, and when providing satellite data services to enterprise customers, there are some specific QoS requirements that should be addressed. An enterprise customer can have many terminals across a large geographical range. Again, a TG may have its guaranteed throughput rate and maximum achievable rate, yet when the network is congested, the guaranteed throughput rate can be assured while the maximum rate can be proportionally allocated subject to certain criteria.

A TG with terminals on a bad/poor quality channel would consume more spectrum resources than the TG is supposed to receive (in order to compensate for the channel quality), resulting in unfairness to those camped on a good quality channel (if bandwidth allocation among TGs is simply based on data throughput (bits/sec)). To combat this, a fair allocation of bandwidth among TGs can be provided in terms of spectrum utilization. As previously discussed, use of spectrum fairness can be considered an optional feature, and thus, may be enabled/disabled as desired.

Figure 7:
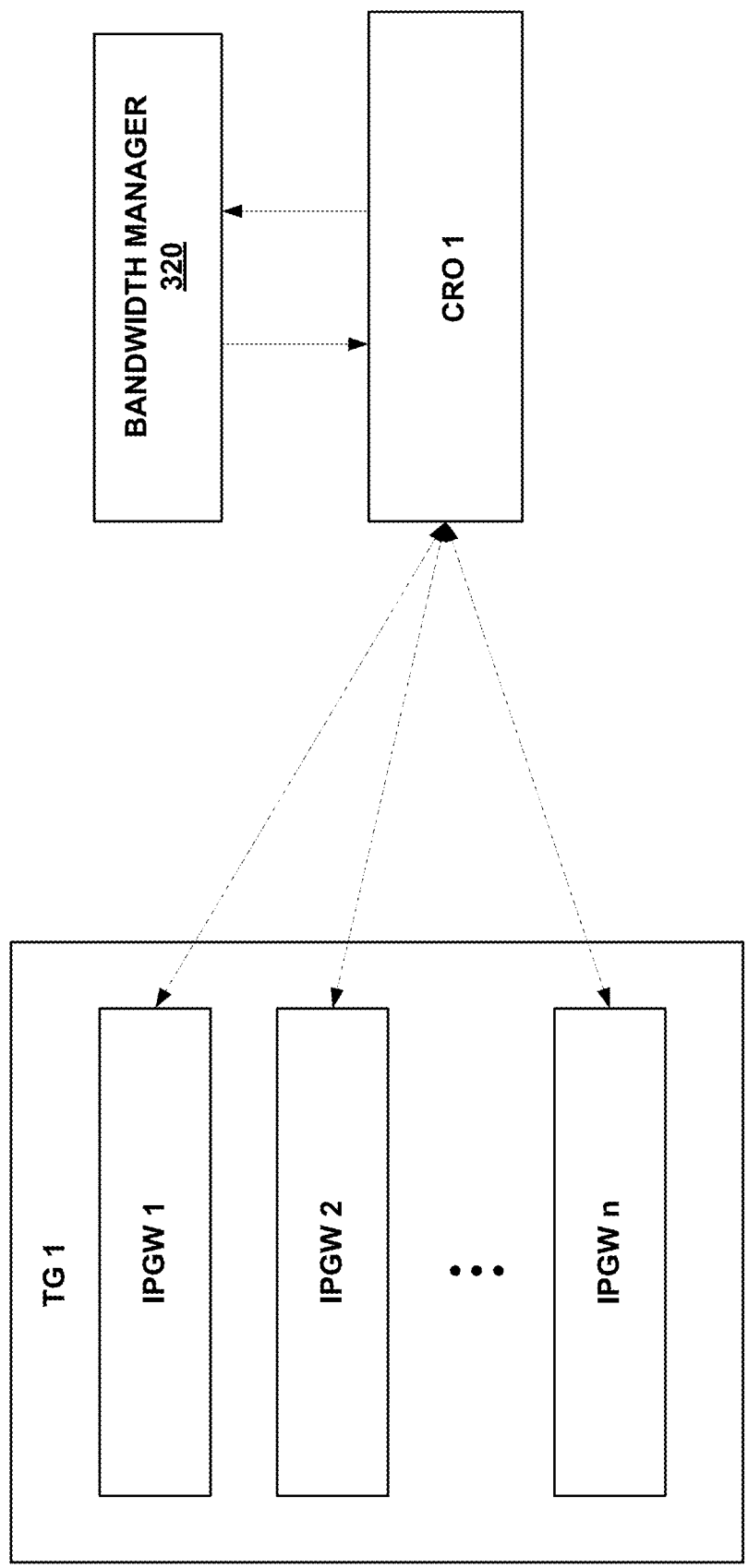
FIG. 7 is a diagrammatic representation of communications between TGs, a CRO, and a bandwidth manager for implementing spectrum fairness in bandwidth partitioning in accordance with various embodiments.

The outroute channel (the CRO, which accesses the spectrum) is a multiplexed stream. This can make it difficult to perform spectrally fair allocation among TGs. Accordingly, spectrum fairness can be applied at the IPGW level. That is, a process can be executed at an IPGW to facilitate bandwidth partition among TGs. FIG. 7 illustrates a diagrammatic representation of spectrum fairness determination in accordance with various embodiments. This example shows that the IPGWs (IPGW #1, IPGW #2, IPGW #J) of a TG can evaluate spectrum efficiency (in bits/symbol) over active terminals associated with it. Upon the IPGW determining the spectrum efficiency, and as previously described, the IPGW can pass such information to the bandwidth manager (or CRO) together with the demand request (as well as the estimated bandwidth requirements). As also described above, the bandwidth partitioning procedures can be either partially done (i.e., variables are pre-processed) at the CRO(s) and then completed at the bandwidth manager, or entirely done at the bandwidth manager. The bandwidth manager may then calculate the weighted average spectrum efficiency of a TG by evaluating the spectrum efficiency of each IPGW of this TG. When partitioning the bandwidth, the bandwidth manager receives an average spectrum efficiency as an input. The resultant allocated throughput will then implicitly achieve fair spectrum utilization at the CRO.

In particular, the spectrum efficiency of an IPGW can be evaluated by the ratio of the scheduled throughput (kbps) and the needed symbols to carry such throughput because as described previously, spectrum efficiency can be indicative of the number of information bits carried by each symbol. Such symbols can be obtained using the scheduled throughput for each MODCOD scheme. This is also equivalent to the aggregate symbols for each active terminal.

K(t) can be the number of active terminals at time t, where t (in 100 ms) is the IPGW-CRO bandwidth allocation period. N can refer to the number of MODCOD types, and $(M_i, r_i)$ can represent the MODCOD type i, where $M_i$ is determined by modulation type ($M_i$=2, 3, 4, 5 for QPSK, 8 APSK, 16 APSK and 32 APSK, respectively), and $r_i$ (which is a decimal) is the code rate, i=1, . . . , N. $A_k(t)$ and $A_{IPGW}(t)$ can be the scheduled throughput (in bits) for an individual terminal k and the IPGW (an IPGW instance representing a TG) respectively at time t.

The total IPGW throughput can be represented as follows.

$$A_{IPGW}(t) = \sum_{k=1}^{K(t)} A_k(t). \quad (1)$$

The number of symbols for terminal k at time t is given as $$S_k(t) = \frac{A_k(t)}{M_i^{(k)} \cdot r_i^{(k)}}, \quad (2)$$

where $M_i^{(k)}$ and $r_i^{(k)}$ represent the modulation and coding rate for the k-th terminal, respectively, and i is the MODCOD type determined at run-time.

The total number of symbols for all active terminals at time t is $$S_{IPGW}(t) = \sum_{k=1}^{K(t)} S_k(t) = \sum_{k=1}^{K(t)} \frac{A_k(t)}{M_i^{(k)} \cdot r_i^{(k)}}. \quad (3)$$

The spectrum efficiency, $\Psi$, is defined as the number of information bits per symbol. Thus the spectrum efficiency at the IPGW can be found by $$\psi_{IPGW}(t) = \frac{\sum_{k=1}^{K(t)} A_k(t)}{\sum_{k=1}^{K(t)} S_k(t)} = \frac{\sum_{k=1}^{K(t)} A_k(t)}{\sum_{k=1}^{K(t)} \frac{A_k(t)}{M_i^{(k)} \cdot r_i^{(k)}}}. \quad (4)$$

$\Psi w_{EMA}(t)$ and $A_{EMA}(t)$ can be the long term average. Accordingly, the following can be determined $$\Psi_{EMA,IPGW}(t) = a \cdot \Psi_{IPGW}(t) + (1-a) \cdot \Psi_{IPGW}(t-1), \quad (5)$$

$$A_{EMA,IPGW}(t) = b \cdot A_{IPGW}(t) + (1-b) \cdot A_{IPGW}(t-1) \quad (6)$$

In above, a and b are smoothing factors, with default values of a=0.001 and b=0.01. The former is equivalent to about 200 seconds of averaging time, while the latter about 20 seconds. It should be noted that other values can be utilized in accordance with other embodiments depending on the amount of smoothing that may be desired.

When the overall throughput is zero, i.e., $A_k(t)$=0, k=1, . . . , K(t), $\Psi_{IPGW}(t)$=2.0 by default. Throughput $A_{EMA,IPGW}(t)$ is calculated because when a TG contains multiple IPGWs, the spectrum efficiency of the TG should be obtained by taking the average weighted by the throughput $A_{EMA,IPGW}(t)$ of involved IPGWs.

The IPGW then informs the bandwidth manager or CRO of the average spectrum efficiency and throughput, $\Psi_{EMA,IPGW}(t)$ and $A_{EMA,IPGW}(t)$ at each period (100 ms), together with the bandwidth request.

To achieve spectral fairness in bandwidth partitioning, J can be the number of TGs, and $N_j$ can be the number of IPGWs (or IPGW instances) associated with TG j, j=1, . . . , J. The weighted average spectrum efficiency for TG j can be expressed as $$\psi_{TG,j}(t) = \frac{\sum_{n=1}^{N_j} [A_{EMA,IPGW}^{(n)}(t) \cdot \psi_{EMA,IPGW}^{(n)}(t)]}{\sum_{n=1}^{N_j} A_{EMA,IPGW}^{(n)}(t)}, \quad (7)$$

where $\Psi_{EMA,IPGW}^{(n)}(t)$ and $A_{EMA,IPGW}^{(n)}(t)$ are the spectrum efficiency and throughput from the n-th IPGW instance of TG j at time t.

If the overall throughput of a TG is zero, the default value, $\Psi_{TG,j}(t)$=2.0, can be applied. In general, the range of $\Psi_{TG,j}(t)$ can be between 1.0 to 5.0 for QPSK to 32 for APSK across the code rates (so it can be bounded in implementation to avoid being too small or too large).

In the TG bandwidth partition algorithm discussed previously, the concept of proportional fair allocation is applied. For example, for TGs j and j+1 (j,j+1∈J), the average allocated bandwidth (in terms of throughput rate) can be expressed as $$\frac{R_j}{R_{max,j}} = \frac{R_{j+1}}{R_{max,j+1}}, \quad (8)$$

where $R_j$ and $R_{max,j}$ are the actual and maximum throughput rates for TG j, respectively.

To achieve proportional fairness in spectrum utilization, $\Psi_{TG,j}(t)$ can be applied as a coefficient to the maximum rate $R_{max,j}$. Thus the following ratio would be sustained:

$$\frac{R_j}{\psi_{TG,j} \cdot R_{max,j}} = \frac{R_{j+1}}{\psi_{TG,j+1} \cdot R_{max,j+1}}. \quad (9)$$

Note the above variables $R_j$, $R_{j+1}$, $\Psi_{TG,j}$, and $\Psi_{TG,j+1}$ represent average values in bandwidth partitioning.

Because $\Psi_{TG,j}(t)$ is updated every period (100 ms), it can be used to update the sorting ratio $$\frac{R_j(t)}{\psi_{TG,j}(t) \cdot R_{max,j}},$$

j=1, ..., J, every period. Alternatively, $\Psi_{TG_j}(t)$ may also be updated for the sorting ratio at multiple periods. An optimal interval may be considered, but generally, the updating interval should not affect the stability of the long term average throughput ratio.

Still another aspect of bandwidth management that can be considered in various embodiments is the manner in which information throughput may be quantified. The bandwidth provided by a wireless/satellite channel may be measured by the carried information rate, referred to as Air Bits. Because compression techniques are used at the transmission and receiving ends, the actual information rate of user applications may be higher than the original information rate (after compression). Thus, the original information rate can be referred to as Router Bits. A TG's subscription rate may be measured in terms of Router Bits. When performing bandwidth allocation, a conversion from Router Bits to Air Bits may be needed.

FIG. 8 is a flow chart illustrating example operations that can be executed to perform this information rate conversion in accordance with various embodiments. In particular, and at operation 800, a ratio between the information (per subscription) rate measured prior to application of any compression (i.e., in Router Bits) and the information rate measured after compression (i.e., in Air Bits) is determined. This ratio can be determined based on information rate measurements over a large variety of user applications. Such a ratio can be referred to as the Router Bits to Air Bits ratio (R-to-A ratio). At operation 802, an original information rate of a TG during determining bandwidth allocation is received. At operation 804, the ratio is applied to the original information rate of the TG to convert the original information rate to a carried information rate for the TG.

For example, the long term R-to-A ratio for a TG may be 1:0.8, where the TG's subscription is defined by the information rate relevant to applications, i.e., the Router Bits. Accordingly, and if the information rate in Router Bits is, e.g., 100 Mbps, the converted carried information rate (per the TG's subscription) in Air Bits would be 80 Mbps after application of the 1:0.8 R-to-A ratio.

Various embodiments described herein are directed to systems and methods of bandwidth allocation among TGs with proportional fairness in terms of both throughput and spectrum usage across a network, e.g., in accordance with a subscription plan, pre-assigned weighting, and/or time-varying aggregate spectrum efficiency, where users can be spread over a large geographical area (and served by multiple satellite beams). Not only are QoS metrics for TGs satisfied in terms of maximum throughput and spectrum utilization, but QoS metrics such as latency, throughput, and prioritized traffic services for individual terminals are also provided. Further still, various embodiments are able to operate seamlessly with existing satellite bandwidth allocation schemes and/or mechanisms for individual terminals, as well as network congestion control algorithm and protocols.

Figure 9:
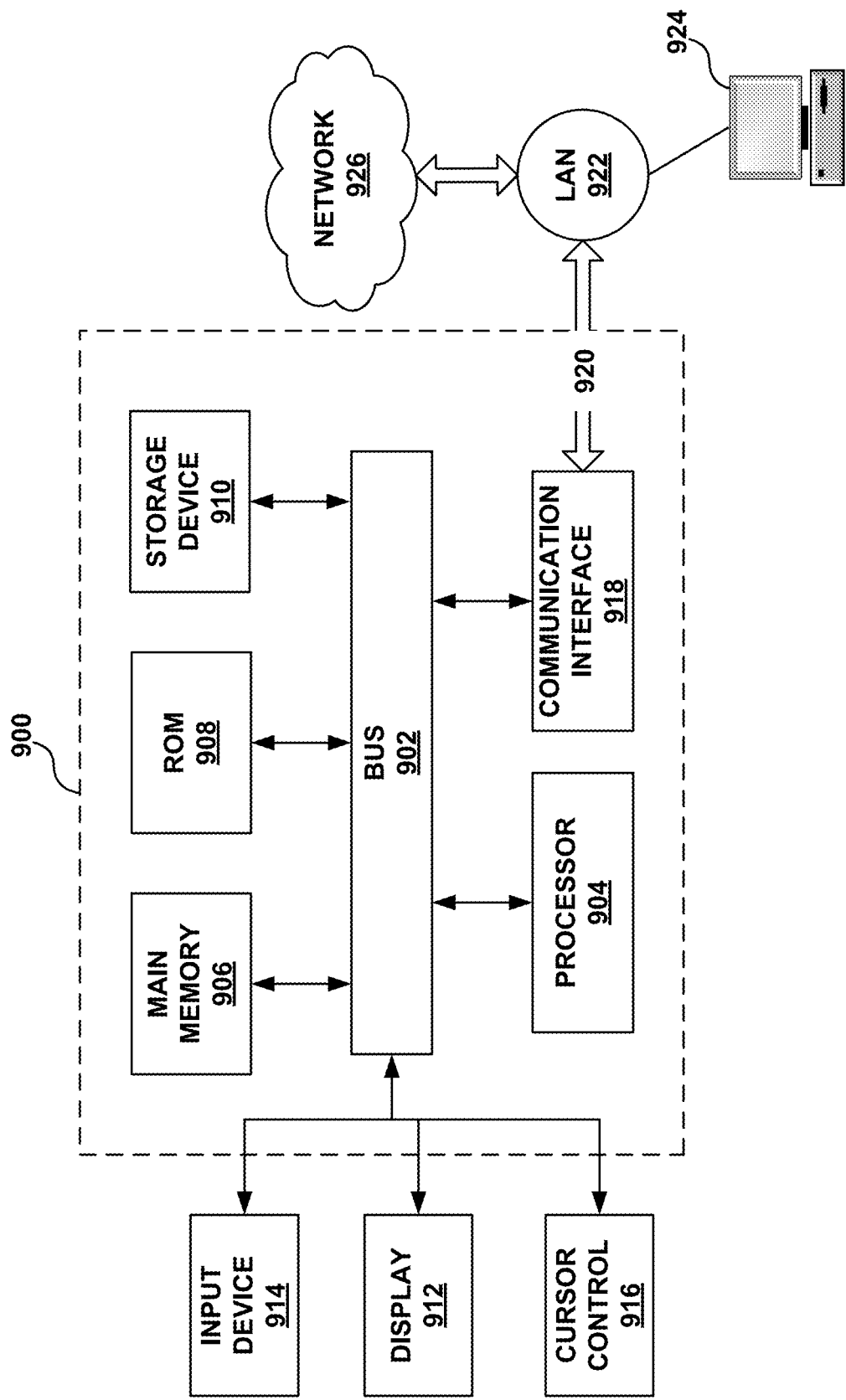
FIG. 9 illustrates an example computing module that may be used in implementing features of various embodiments.

FIG. 9 illustrates a computer system 900 upon which example embodiments according to the present invention can be implemented. Computer system 900 can include a bus 902 or other communication mechanism for communicating information, and a processor 904 coupled to bus 902 for processing information. Computer system 900 may also include main memory 906, such as a random access memory (RAM) or other dynamic storage device, coupled to bus 902 for storing information and instructions to be executed by processor 904. Main memory 906 can also be used for storing temporary variables or other intermediate information during execution of instructions to be executed by processor 904. Computer system 900 may further include a read only memory (ROM) 908 or other static storage device coupled to bus 902 for storing static information and instructions for processor 904. A storage device 910, such as a magnetic disk or optical disk, may additionally be coupled to bus 902 for storing information and instructions.

Computer system 900 can be coupled via bus 902 to a display 912, such as a cathode ray tube (CRT), liquid crystal display (LCD), active matrix display, light emitting diode (LED)/organic LED (OLED) display, digital light processing (DLP) display, or plasma display, for displaying information to a computer user. An input device 914, such as a keyboard including alphanumeric and other keys, may be coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912.

According to one embodiment of the invention, dynamic bandwidth management, in accordance with example embodiments, are provided by computer system 900 in response to processor 904 executing an arrangement of instructions contained in main memory 906. Such instructions can be read into main memory 906 from another computer-readable medium, such as storage device 910. Execution of the arrangement of instructions contained in main memory 906 causes processor 904 to perform one or more processes described herein. One or more processors in a multi-processing arrangement may also be employed to execute the instructions contained in main memory 906. In alternative embodiments, hard-wired circuitry is used in place of or in combination with software instructions to implement various embodiments. Thus, embodiments described in the present disclosure are not limited to any specific combination of hardware circuitry and software.

Computer system 900 may also include a communication interface 918 coupled to bus 902. Communication interface 918 can provide a two-way data communication coupling to a network link 920 connected to a local network 922. By way of example, communication interface 918 may be a digital subscriber line (DSL) card or modem, an integrated services digital network (ISDN) card, a cable modem, or a telephone modem to provide a data communication connection to a corresponding type of telephone line. As another example, communication interface 918 may be a local area network (LAN) card (e.g. for Ethernet™ or an Asynchronous Transfer Model (ATM) network) to provide a data communication connection to a compatible LAN. Wireless links can also be implemented. In any such implementation, communication interface 918 sends and receives electrical, electromagnetic, or optical signals that carry digital data streams representing various types of information. Further, communication interface 918 may include peripheral interface devices, such as a Universal Serial Bus (USB) interface, a PCMCIA (Personal Computer Memory Card International Association) interface, etc.

Network link 920 typically provides data communication through one or more networks to other data devices. By way of example, network link 920 can provide a connection through local network 922 to a host computer 924, which has connectivity to a network 926 (e.g. a wide area network (WAN) or the global packet data communication network now commonly referred to as the "Internet") or to data equipment operated by service provider. Local network 922 and network 926 may both use electrical, electromagnetic, or optical signals to convey information and instructions.

The signals through the various networks and the signals on network link 920 and through communication interface 918, which communicate digital data with computer system 900, are example forms of carrier waves bearing the information and instructions.

Computer system 900 may send messages and receive data, including program code, through the network(s), network link 920, and communication interface 918. In the Internet example, a server (not shown) might transmit requested code belonging to an application program for implementing an embodiment of the present invention through network 926, local network 922 and communication interface 918. Processor 904 executes the transmitted code while being received and/or store the code in storage device 910, or other non-volatile storage for later execution. In this manner, computer system 900 obtains application code in the form of a carrier wave.

The term "computer-readable medium" as used herein refers to any medium that participates in providing instructions to processor 904 for execution. Such a medium may take many forms, including but not limited to non-volatile media, volatile media, and transmission media. Non-volatile media include, for example, optical or magnetic disks, such as storage device 910. Volatile media may include dynamic memory, such as main memory 906. Transmission media may include coaxial cables, copper wire and fiber optics, including the wires that comprise bus 902. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 10:
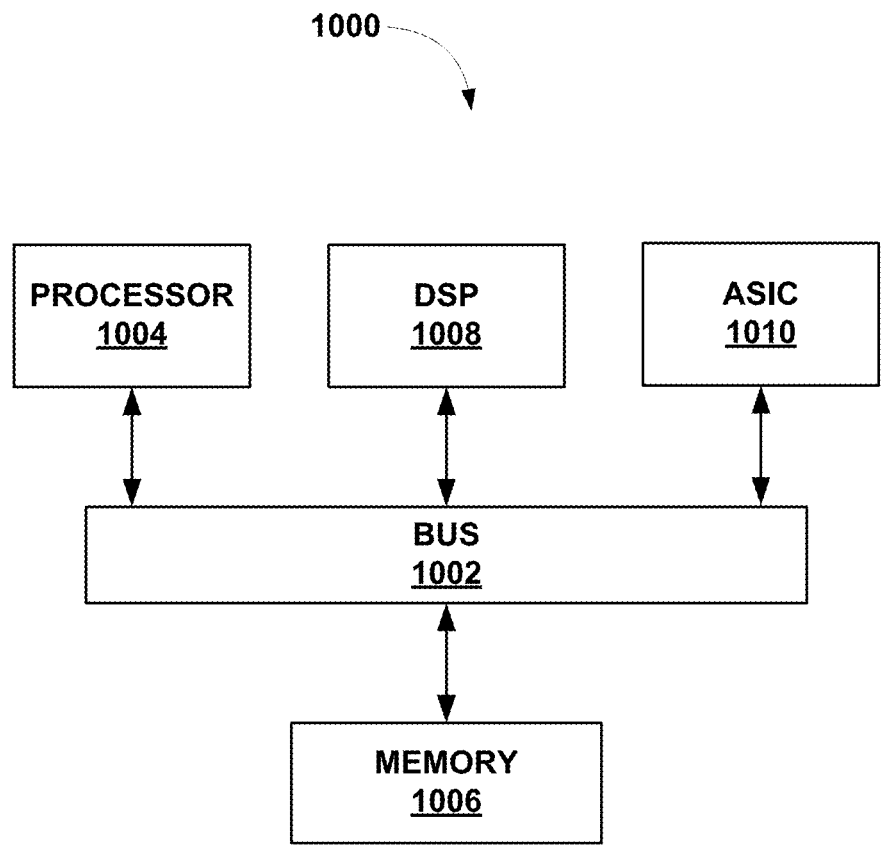
FIG. 10 illustrates an example chip set that can be utilized in implementing architectures and methods for dynamic bandwidth allocation in accordance with various embodiments.

FIG. 10 illustrates a chip set 1000 in which embodiments of the invention may be implemented. Chip set 1000 can include, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1000 includes a communication mechanism such as a bus 1002 for passing information among the components of the chip set 1000. A processor 1004 has connectivity to bus 1002 to execute instructions and process information stored in a memory 1006. Processor 1004 includes one or more processing cores with each core configured to perform independently. A multi-core processor enables multiprocessing within a single physical package. Examples of a multi-core processor include two, four, eight, or greater numbers of processing cores. Alternatively or in addition, processor 1004 includes one or more microprocessors configured in tandem via bus 1002 to enable independent execution of instructions, pipelining, and multithreading. Processor 1004 may also be accompanied with one or more specialized components to perform certain processing functions and tasks such as one or more digital signal processors (DSP) 1008, and/or one or more application-specific integrated circuits (ASIC) 1010. DSP 1008 can typically be configured to process real-world signals (e.g., sound) in real time independently of processor 1004. Similarly, ASIC 1010 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1004 and accompanying components have connectivity to the memory 1006 via bus 1002. Memory 1006 includes both dynamic memory (e.g., RAM) and static memory (e.g., ROM) for storing executable instructions that, when executed by processor 1004, DSP 1008, and/or ASIC 1010, perform the process of example embodiments as described herein. Memory 1006 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   determining a maximum bandwidth allocation limit for each terminal group (TG) of multiple TGs of a shared access broadband network, each of the TGs including a plurality of terminals that are logically grouped together and physically separated from each other;
   calculating an exponential moving average (EMA) for an allocated bandwidth of each of the TGs at a given time;
   calculating a sorting ratio for each of the TGs based on a subscription rate of the TG, the EMA calculated for the allocated bandwidth for the TG, an estimated spectrum efficiency and throughput of a code rate organizer (CRO) of the TG; and
   assigning bandwidth to a first TG of the TGs that has the smallest sorting ratio of the sorting ratios.

2. The method of claim 1, wherein calculating the sorting ratio for each of the TGs comprises: calculating the sorting ratio based on the subscription rate of the TG, the EMA calculated for the allocated bandwidth for the TG, a priority of the TG, and the estimated spectrum efficiency and throughput of the CRO of the TG.

3. The method of claim 1, wherein calculating the sorting ratio for each of the TGs comprises: calculating the sorting ratio in accordance with at least one bandwidth allocation period.

4. The method of claim 1, further comprising: assigning remaining, unassigned bandwidth to a second TG of the TGs that has the second smallest sorting ratio.

5. The method of claim 1, wherein the plurality of terminals comprise a plurality of satellite terminals physically separated from each other across multiple spot beams.

6. A method, comprising:
   determining a maximum bandwidth allocation limit for each terminal group (TG) of multiple TGs of a shared access broadband network, each of the TGs including a plurality of terminals that are logically grouped together and physically separated from each other;
   calculating an exponential moving average (EMA) for an allocated bandwidth of each of the TGs at a given time according to $S_i(t)=\alpha \cdot R_i(t)+(1-\alpha) \cdot S_i(t-1)$, where t is the given time, $S_i$ is an average assigned bandwidth for an i-th TG, $R_i$ is an instant assigned bandwidth for the i-th TG, and $\alpha$ is a smoothing factor determining a filter equivalent time constant;
   calculating a sorting ratio for each of the TGs based on a subscription rate of the TG and the EMA calculated for the allocated bandwidth for the TG; and
   assigning bandwidth to a first TG of the TGs that has the smallest sorting ratio of the sorting ratios.

7. The method of claim 6, wherein calculating the sorting ratio comprises: calculating $r_i(t)=S_i(t)/A_i(t)$, wherein $A_i$ is a maximum subscription rate limit of the TG.

8. The method of claim 6, wherein calculating the sorting ratio comprises: calculating $$r_i(t) = \frac{S_i(t)}{g_i A_i},$$

wherein $A_i$ is a maximum subscription rate limit of the TG, and $g_i$ is an index representing a priority of the i-th TG.

9. The method of claim 6, wherein calculating the sorting ratio comprises: calculating $$r_i(t) = \frac{S_i(t)/\psi_i}{g_i A_i},$$

wherein $A_i$ is a maximum subscription rate limit of the TG, $g_i$ is an index representing a priority of the i-th TG, and $\Psi_i$, is a spectrum efficiency for a CRO of the TG.

10. One or more non-transitory computer-readable mediums storing instructions executable by one or more processors, wherein execution of the instructions cause the one or more processors to perform operations comprising:

determining a maximum bandwidth allocation limit for each terminal group (TG) of multiple TGs of a shared access broadband network, each of the TGs including a plurality of terminals that are logically grouped together and physically separated from each other;

calculating an exponential moving average (EMA) for an allocated bandwidth of each of the TGs at a given time;

calculating a sorting ratio for each of the TGs based on a subscription rate of the TG, the EMA calculated for the allocated bandwidth for the TG, an estimated spectrum efficiency and throughput of a code rate organizer (CRO) of the TG; and assigning bandwidth to a first TG of the TGs that has the smallest sorting ratio of the sorting ratios.

11. The one or more non-transitory computer-readable mediums of claim 10, wherein calculating the sorting ratio for each of the TGs comprises: calculating the sorting ratio based on the subscription rate of the TG, the EMA calculated for the allocated bandwidth for the TG, a priority of the TG, and an estimated spectrum efficiency and throughput of the CRO of the TG.

12. The one or more non-transitory computer-readable mediums of claim 10, wherein calculating the sorting ratio for each of the TGs comprises: calculating the sorting ratio in accordance with at least one bandwidth allocation period.

13. The one or more non-transitory computer-readable mediums of claim 10, wherein the operations further comprise: assigning remaining, unassigned bandwidth to a second TG of the TGs that has the second smallest sorting ratio.

14. The one or more non-transitory computer-readable mediums of claim 10, wherein the plurality of terminals comprise a plurality of satellite terminals physically separated from each other across multiple spot beams.

15. One or more non-transitory computer-readable mediums storing instructions executable by one or more processors, wherein execution of the instructions cause the one or more processors to perform operations comprising:

determining a maximum bandwidth allocation limit for each terminal group (TG) of multiple TGs of a shared access broadband network, each of the TGs including a plurality of terminals that are logically grouped together and physically separated from each other;

calculating an exponential moving average (EMA) for an allocated bandwidth of each of the TGs at a given time according to $S_i(t) = \alpha \cdot R_i(t) + (1-\alpha) \cdot S_i(t-1)$, where t is the given time, $S_i$ is an average assigned bandwidth for an i-th TG, $R_i$ is an instant assigned bandwidth for the i-th TG, and $\alpha$ is a smoothing factor determining a filter equivalent time constant;

calculating a sorting ratio for each of the TGs based on a subscription rate of the TG and the EMA calculated for the allocated bandwidth for the TG; and assigning bandwidth to a first TG of the TGs that has the smallest sorting ratio of the sorting ratios.

16. The one or more non-transitory computer-readable mediums of claim 15, wherein calculating the sorting ratio comprises: calculating $r_i(t) = S_i(t)/A_i(t)$, wherein $A_i$ is a maximum subscription rate limit of the TG.

17. The one or more non-transitory computer-readable mediums of claim 15, wherein calculating the sorting ratio comprises: calculating $$r_i(t) = \frac{S_i(t)}{g_i A_i},$$

wherein $A_i$ is a maximum subscription rate limit of the TG, and $g_i$ is an index representing a priority of the i-th TG.

18. The one or more non-transitory computer-readable mediums of claim 15, wherein calculating the sorting ratio comprises: calculating $$r_i(t) = \frac{S_i(t)/\psi_i}{g_i A_i},$$

wherein $A_i$ is a maximum subscription rate limit of the TG, $g_i$ is an index representing a priority of the i-th TG, and $\Psi_i$ is a spectrum efficiency for a CRO of the TG.

19. A method, comprising:
determining, for at least a first terminal group (TG), a ratio of measured information rate prior to compression and measured information rate after compression;

receiving, during determination of bandwidth allocation across multiple TGs of a shared access broadband network, an original information rate of each of the TGs, wherein the TGs include the first TG, and each TG of the TGs includes a plurality of satellite terminals that are logically grouped together and physically separated from each other across multiple spot beams;

applying the ratio to the original information rate of the first TG to convert the original information rate of the first TG to a carried information rate of the first TG; and assigning bandwidth to the first TG in the shared access broadband network based on the carried information rate of the first TG.

20. The method of claim 19, wherein the measured information rate prior to compression and the measured information rate after compression are accumulated information rates associated with a plurality of user applications involving transmission and reception of data packets over the shared access broadband network.

* * * * *